US012034491B2

(12) United States Patent
Babakhani et al.

(10) Patent No.: US 12,034,491 B2
(45) Date of Patent: Jul. 9, 2024

(54) ELECTRONIC FREQUENCY-COMB DETECTOR

(71) Applicant: The Regents of the University of California, Oakland, CA (US)

(72) Inventors: Aydin Babakhani, Los Angeles, CA (US); Babak Jamali, Los Altos, CA (US)

(73) Assignee: The Regents of the University of California, Oakland, CA (US)

( * ) Notice: Subject to any disclaimer, the term of this patent is extended or adjusted under 35 U.S.C. 154(b) by 363 days.

(21) Appl. No.: 17/426,528

(22) PCT Filed: Jan. 28, 2020

(86) PCT No.: PCT/US2020/015461
§ 371 (c)(1),
(2) Date: Jul. 28, 2021

(87) PCT Pub. No.: WO2020/160026
PCT Pub. Date: Aug. 6, 2020

(65) Prior Publication Data
US 2022/0103264 A1 Mar. 31, 2022

Related U.S. Application Data

(60) Provisional application No. 62/961,471, filed on Jan. 15, 2020, provisional application No. 62/798,370, filed on Jan. 29, 2019.

(51) Int. Cl.
*H04B 10/06* (2006.01)
*H04B 10/50* (2013.01)
(Continued)

(52) U.S. Cl.
CPC ........... *H04B 10/90* (2013.01); *H04B 10/501* (2013.01); *H04B 10/61* (2013.01); *G02F 2203/56* (2013.01)

(58) Field of Classification Search
CPC ...... H04B 10/61; H04B 10/501; H04B 10/64; H04B 10/40; H04B 10/2507;
(Continued)

(56) References Cited

U.S. PATENT DOCUMENTS 5,534,947 A 7/1996 Saionji
8,748,822 B1 * 6/2014 Gerecht ............. G01N 21/3586
250/339.07

(Continued)

FOREIGN PATENT DOCUMENTS

WO 2017205565 A1 11/2017
WO 2018209437 A1 11/2018
(Continued)

OTHER PUBLICATIONS

International Preliminary Report on Patentability for International Application PCT/US2020/015461, Report dated Jul. 27, 2021, dated Aug. 12, 2021, 13 Pgs.
(Continued)

*Primary Examiner* — Hanh Phan
(74) *Attorney, Agent, or Firm* — KPPB LLP

(57) ABSTRACT

Systems and methods in accordance with embodiments of the invention implement electronic frequency-comb detector systems. One embodiment includes an electronic frequency-comb detector, where the electronic frequency-comb detector includes: a frequency-comb generator configured to generate a frequency comb reference signal, and a heterodyne mixer. In addition, the heterodyne mixer is configured to use the frequency comb reference signal to downconvert received millimeter wave (mm-wave) and terahertz (THZ) frequency tones into an intermediate frequency (IF) signal. In a further embodiment, the electronic frequency-comb detector includes an IF amplifier, where the IF amplifier is
(Continued)

configured to feed a spectrum analyzer configured to detect a signature of a material under test (MUT).

19 Claims, 23 Drawing Sheets

(51) Int. Cl.
 H04B 10/61 (2013.01)
 H04B 10/90 (2013.01)
(58) Field of Classification Search
 CPC .............. H04B 10/0795; H04B 10/6164; H04B 10/90; G01N 22/00; G01J 3/44; G01J 3/453; G01J 3/443
 USPC ....... 398/202, 204, 208, 209, 235, 236, 115, 398/182, 183, 33, 38, 158, 159, 135, 136; 356/73.1, 326
 See application file for complete search history.

(56) References Cited

U.S. PATENT DOCUMENTS

| | | | |
|---|---|---|---|
| 9,778,112 B2* | 10/2017 | Pate | G01J 3/453 |
| 10,749,559 B2* | 8/2020 | Zhong | H04B 1/3827 |
| 2007/0085719 A1 | 4/2007 | Maxim et al. | |
| 2007/0211786 A1 | 9/2007 | Shattil | |
| 2010/0308974 A1 | 12/2010 | Rowland et al. | |
| 2013/0154611 A1 | 6/2013 | Pate et al. | |
| 2016/0380754 A1 | 12/2016 | Chen et al. | |
| 2017/0069967 A1 | 3/2017 | Shrekenhamer | |
| 2017/0195072 A1 | 7/2017 | Lomnitz | |
| 2018/0006730 A1 | 1/2018 | Kuo et al. | |
| 2018/0303391 A1 | 10/2018 | Roblyer et al. | |
| 2019/0180065 A1 | 6/2019 | Babakhani et al. | |
| 2022/0252506 A1 | 8/2022 | Babakhani et al. | |

FOREIGN PATENT DOCUMENTS

| | | |
|---|---|---|
| WO | 2020160026 A1 | 8/2020 |
| WO | 2021007071 A1 | 1/2021 |

OTHER PUBLICATIONS

International Preliminary Report on Patentability for International Application PCT/US2020/040283, Report dated Jan. 11, 2022, dated Jan. 20, 2022, 7 Pgs.
International Search Report and Written Opinion for International Application No. PCT/US2020/040283, Search completed Aug. 17, 2020, dated Sep. 28, 2020, 17 Pgs.
International Search Report and Written Opinion for International Application PCT/US2020/015461, Report Completed Mar. 30, 2020, dated May 21, 2020, 19 Pgs.
Abbasi et al., "Single-Chip 220-GHz Active Heterodyne Receiver and Transmitter MMICs With On-Chip Integrated Antenna", IEEE Transactions on Microwave Theory and Techniques, Feb. 2011, vol. 59, Issue 2, pp. 466-478.
Agarwal et al., "A 4μW, ADPLL-Based Implantable Amperometric Biosensor in 65nm CMOS", 2017 Symposium on VLSI Circuits, Kyoto, Japan, 2017, pp. C108-C109. doi: 10.23919/VLSIC.2017.8008566.
Al Hadi et al., "A 1 k-Pixel Video Camera for 0.7-1.1 Terahertz Imaging Applications in 65-nm CMOS", IEEE Journal of Solid-State Circuits, Dec. 2012, First Published: Nov. 29, 2012, vol. 47, No. 12, pp. 2999-3012, DOI: 10.1109/JSSC.2012.2217851.
Atzori et al., "The Internet of Things: A survey", Computer Networks, Oct. 2010, vol. 54, Issue 15, pp. 2787-2805, https://doi.org/10.1016/j.comnet.2010.05.010.
Bigio et al., "Microwave absorption spectroscopy of DNA", Biopolymers, Jan. 1993, vol. 33, Issue 1, pp. 147-150, https://doi.org/10.1002/bip.360330114.
Chen et al., "3D Radar Imaging based on a Synthetic Array of 30GHz Impulse Radiators with On-Chip Antennas in 130nm SiGe BiCMOS", IEEE Transactions on Microwave Theory and Techniques, Nov. 2017, vol. 65, No. 22, pp. 4373-4384.
Dickson, "On-chip high-voltage generation in MNOS integrated circuits using an improved voltage multiplier technique", IEEE Journal of Solid-State Circuits, 1976, vol. 11, No. 3, pp. 374-378, http://dx.doi.org/10.1109/JSSC.1976.1050739.
Ding et al., "Inattentive Driving Behavior Detection Based on Portable FMCW Radar", IEEE Transactions on Microwave Theory and Techniques, vol. 67, No. 10, Oct. 2019, First Published: Aug. 27, 2019, pp. 4031-4041, DOI: 10.1109/TMTT.2019.2934413.
Glaab et al., "Terahertz heterodyne detection with silicon field-effect transistors", Applied Physics Letters, Jan. 27, 2010, vol. 96, No. 4, Article 042106, pp. 042106-1-042106-3, https://doi.org/10.1063/1.3292016.
Grenier et al., "Recent advances in microwave-based dielectric spectroscopy at the cellular level for cancer investigations", IEEE Transactions on Microwave Theory and Techniques, Apr. 11, 2013, vol. 61, No. 5, pp. 2023-2030, doi:10.1109/TMTT.2013.2255885.
Huang et al., "Materials and designs for wireless epidermal sensors of hydration and strain", Advanced Functional Materials, Jul. 2, 2014, vol. 24, Issue 25, pp. 3846-3854, first published Mar. 2, 2014, doi: 10.1002/adfm.201303886.
Jamali et al., "A Fully Integrated 50-280-GHz Frequency Comb Detector for Coherent Broadband Sensing", IEEE Transactions on Terahertz Science and Technology, vol. 9, No. 6, Nov. 2019, First Published: Sep. 26, 2019, pp. 613-623, Doi: 10.1109/TTHZ.2019.2944129.
Jiang et al., "25.5 A 320GHz subharmonic-mixing coherent imager in 0.13μm SiGe BiCMOS", 2016 IEEE International Solid-State Circuits Conference (ISSCC), Jan. 31-Feb. 4, 2016, San Francisco, CA, USA, pp. 432-434, DOI: 10.1109/ISSCC.2016.7418092.
Jiang et al., "A Sub-1 μW Multiparameter Injectable BioMote for Continuous Alcohol Monitoring", IEEE Custom Integrated Circuits Conference (CICC), 2018, pp. 1-4.
Kaya et al., "A CMOS Time Domain Microwave Broadband Dielectric Spectroscopy System with a Contact-less Sensor for Liquid Chemical Detection", 2019 IEEE MTT-S International Microwave Symposium (IMS), Jun. 2-7, 2019, Boston, MA, USA, pp. 800-803, DOI: 10.1109/MWSYM.2019.8700726.
Kennedy et al., "High intensity focused ultrasound: surgery of the future?", British Journal of Radiology, Sep. 2003, vol. 76, No. 909, pp. 590-599, doi: 10.1259/bjr/17150274.
Kim et al., "A 144-MHz Fully Integrated Resonant Regulating Rectifier With Hybrid Pulse Modulation for mm-Sized Implants", IEEE Journal of Solid-State Circuits, Nov. 2017, vol. 52, Issue 11, pp. 3043-3055, DOI: 10.1109/JSSC.2017.2734901.
Knap et al., "Plasma wave detection of sub-terahertz and terahertz radiation by silicon field-effect transistors", Applied Physics Letters, Jul. 23, 2004, vol. 85, No. 4, Article 675, 3 pgs., https://doi.org/10.1063/1.1775034.
Kocer et al., "A new transponder architecture with on-chip ADC for long-range telemetry applications", IEEE Journal of Solid-State Circuits, vol. 41, No. 5, Apr. 24, 2006, pp. 1142-1148 [online], [retrieved on Aug. 14, 2020]. Retrieved from the Internet <URL: https://www.mpflynngroup.com/uploads/7/3/4/9/73490609/01624404.pdf>, entire document, especially: fig. 1, p. 1, col. 2, para 3; p. 2, col. 2, para 2.
Kotani et al., "High-Efficiency Differential-Drive CMOS Rectifier for UHF RFIDs", IEEE Journal of Solid-State Circuits, Nov. 2009, vol. 44, Issue 11, pp. 3011-3018, DOI: 10.1109/JSSC.2009.2028955.
Lisauskas et al., "Rational design of high-responsivity detectors of terahertz radiation based on distributed self-mixing in silicon field-effect transistors", Journal of Applied Physics, Jun. 9, 2009, vol. 105, No. 11, Article 114511, pp. 114511-1-114511-7, https://doi.org/10.1063/1.3140611.
Lonappan et al., "Nondestructive Measurement of Human Blood at Microwave Frequencies", Journal of Electromagnetic Waves and Applications, 2007, vol. 21, Issue 8, 1131-1139, DOI: 10.1163/156939307781749740.

(56) References Cited

OTHER PUBLICATIONS

Lyu et al., "A 430-Mhz Wirelessly Powered Implantable Pulse Generator With Intensity/Rate Control and Sub-1 µA Quiescent Current Consumption", IEEE Transactions on Biomedical Circuits and Systems, vol. 13, No. 1, Feb. 2019, pp. 180-190, DOI: 10.1109/TBCAS.2018.2879357.

Lyu et al., "An Energy-Efficient Wirelessly Powered Millimeter-Scale Neurostimulator Implant Based on Systematic Codesign of an Inductive Loop Antenna and a Custom Rectifier", IEEE Transactions on Biomedical Circuits and Systems, vol. 12, No. 5, Oct. 2018, pp. 1131-1143, DOI: 10.1109/TBCAS.2018.2852680.

Lyu et al., "Towards the Implementation of a Wirelessly Powered Dielectric Sensor with Digitized Output for Implantable Applications", IEEE Sensors Letters, Mar. 2019, vol. 3, No. 3, pp. 1-4, first published Jan. 30, 2019.

Mirzavand et al., "High-Resolution Dielectric Sensor Based on Injection-Locked Oscillators", IEEE Sensors Journal, Jan. 1, 2018, vol. 18, Issue 1, pp. 141-148, published online published Nov. 13, 2017, DOI: 10.1109/JSEN.2017.2772923.

Otsuji et al., "Terahertz Plasmonics: Good Results and Great Expectations", IEEE Microwave Magazine, Nov.-Dec. 2014, vol. 15, No. 7, pp. 43-50, DOI: 10.1109/MMM.2014.2355712.

Paul, "Inductance: loop and partial", John Wiley & Sons, 2011, 395 pgs., presented in two parts.

Pedregosa et al., "Scikit-learn: Machine Learning in Python", Journal of Machine Learning Research, Oct. 2011, vol. 12, pp. 2825-2830.

Preu et al., "Terahertz Detection by a Homodyne Field Effect Transistor Multiplicative Mixer", IEEE Transactions on Terahertz Science and Technology, May 2012, First Published: Apr. 24, 2012, vol. 2, No. 3, pp. 278-283, DOI: 10.1109/TTHZ.2012.2191671.

Rategh et al., "Superharmonic Injection-Locked Frequency Dividers", IEEE Journal of Solid-State Circuits, Jun. 1999, vol. 34, No. 6, pp. 813-821.

Saluja et al., "A Supervised Machine Learning Algorithm for Heart-Rate Detection Using Doppler Motion-Sensing Radar", IEEE Journal of Electromagnetics, RF and Microwaves in Medicine and Biology, vol. 4, No. 1, Mar. 2020, First Published: Jun. 19, 2019, pp. 45-51, DOI: 10.1109/JERM.2019.2923673.

Sample et al., "Analysis, Experimental Results, and Range Adaptation of Magnetically Coupled Resonators for Wireless Power Transfer", IEEE Transactions on Industrial Electronics, vol. 58, No. 2, Feb. 2011, pp. 544-554, DOI: 10.1109/TIE.2010.2046002.

Soontornpipit, "Design of an Implantable Antenna Feasibility Study for Continuous Glucose Monitoring", ECTI Transactions on Electrical Engineering, Electronics, and Communications, Feb. 2014, vol. 12, No. 1, pp. 44-52.

Sun et al., "A wirelessly powered injection-locked oscillator with on-chip antennas in 180nm SOI CMOS", 2016 IEEE MTT-S International Microwave Symposium (IMS), Aug. 11, 2016, pp. 1-3 [online], [retrieved on Aug. 14, 2020]. Retrieved from the Internet <URL: https://ieeexplore.ieee.org/abstract/document/7540249>, entire document.

Sun et al., "A Wirelessly Powered Injection-Locked Oscillator with On-Chip Antennas in 180-nm SOI CMOS for Spectroscopy Application", IEEE Sensors Letters, vol. 3, No. 7, Jul. 3, 2019, pp. 1-4 [online], [retrieved on Aug. 14, 2020]. Retrieved from the Internet <URL: https://ieeexplore.ieee.org/abstract/document/8754750>.

Vakili et al., "Time-Domain System for Millimeter-Wave Material Characterization", IEEE Transactions on Microwave Theory and Techniques, vol. 63, No. 9, Sep. 2015, First Published: Jul. 14, 2015, pp. 2915-2922, DOI: 10.1109/TMTT.2015.2449833.

Wang et al., "17.6 Rapid and energy-efficient molecular sensing using dual mm-Wave combs in 65nm CMOS: A 220-to-320GHz spectrometer with 5.2mW radiated power and 14.6-to-19.5dB noise figure", 2017 IEEE International Solid-State Circuits Conference (ISSCC), Feb. 5-9, 2017, San Francisco, CA, USA, pp. 302-303, DOI: 10.1109/ISSCC.2017.7870381.

Wang et al., "Dual-Terahertz-Comb Spectrometer on CMOS for Rapid, Wide-Range Gas Detection with Absolute Specificity", IEEE Journal of Solid-State Circuits, vol. 52, No. 12, Dec. 2017, First Published: Oct. 16, 2017, pp. 3361-3372, DOI: 10.1109/JSSC.2017.2755693.

Weiss et al., "One-Shot Learning for Robust Material Classification Using Millimeter-Wave Radar System", IEEE Sensors Letters, vol. 2, No. 4, Dec. 2018, First Published: Oct. 25, 2018, pp. 1-4, DOI: 10.1109/LSENS.2018.2878041.

Wu et al., "25.3 A 40-to-330GHz synthesizer-free THz spectroscope-on-chip exploiting electromagnetic scattering", 2016 IEEE International Solid-State Circuits Conference (ISSCC), Jan. 31-Feb. 4, 2016, San Francisco, CA, USA, pp. 428-429, DOI: 10.1109/ISSCC.2016.7418090.

Wu et al., "On-Chip THz Spectroscope Exploiting Electromagnetic Scattering With Multi-Port Antenna", IEEE Journal of Solid-State Circuits, Dec. 2016, First Published Sep. 2, 2016, vol. 51, No. 12, pp. 3049-3062, DOI: 10.1109/JSSC.2016.2597845.

Xie et al., "Wireless power transfer and applications to sensor networks", IEEE Wireless Communications, Aug. 2013, vol. 20, Issue: 4, pp. 140-145, DOI: 10.1109/MWC.2013.6590061.

Yvanoff et al., "A Feasibility Study of Tissue Characterization Using Implanted LC Sensors", IEEE Transactions on Antennas and Propagation, Apr. 2009, vol. 57, Issue 4, pp. 885-893, DOI: 10.1109/TAP.2009.2016073.

Zargham et al., "Fully Integrated On-Chip Coil in 0.13 µm CMOS for Wireless Power Transfer Through Biological Media", IEEE Transactions on Biomedical Circuits and Systems, Apr. 2015, vol. 9, Issue 2, pp. 259-271, 13 pgs. DOI: 10.1109/TBCAS.2014.2328318.

Choi et al., "A Wirelessly Powered Microspectrometer for Neural Probe-Pin Device.", Micro+Nano Materials, Devices, and Systems, 2015, vol. 9668. SPIE, 8 pgs.

* cited by examiner

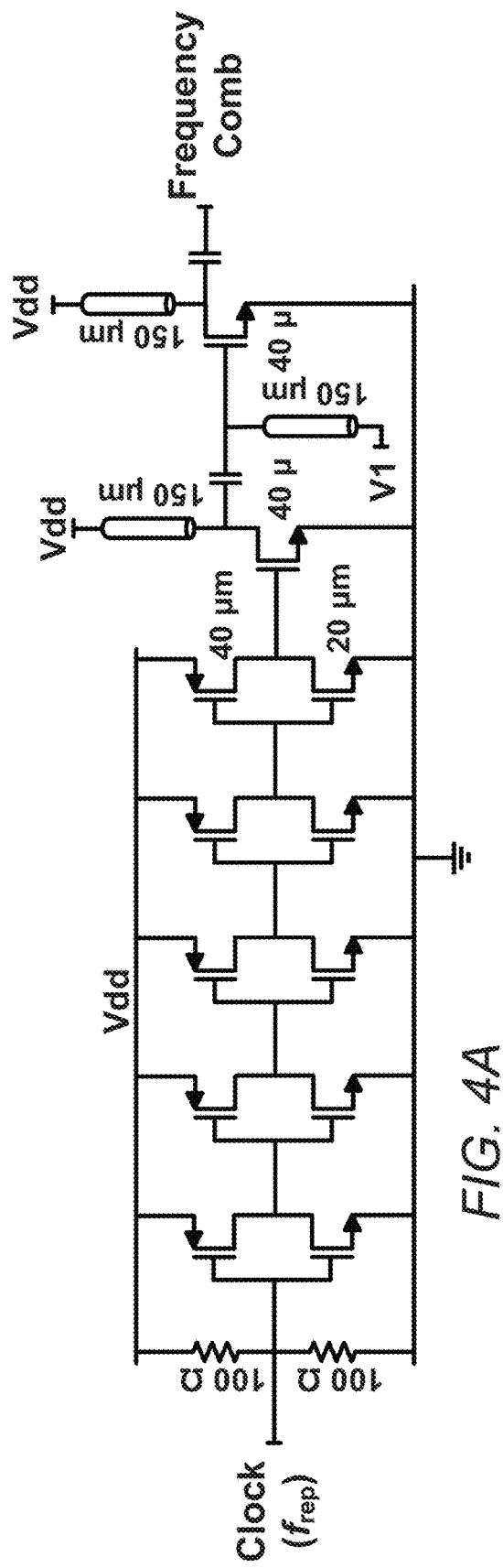
FIG. 4A
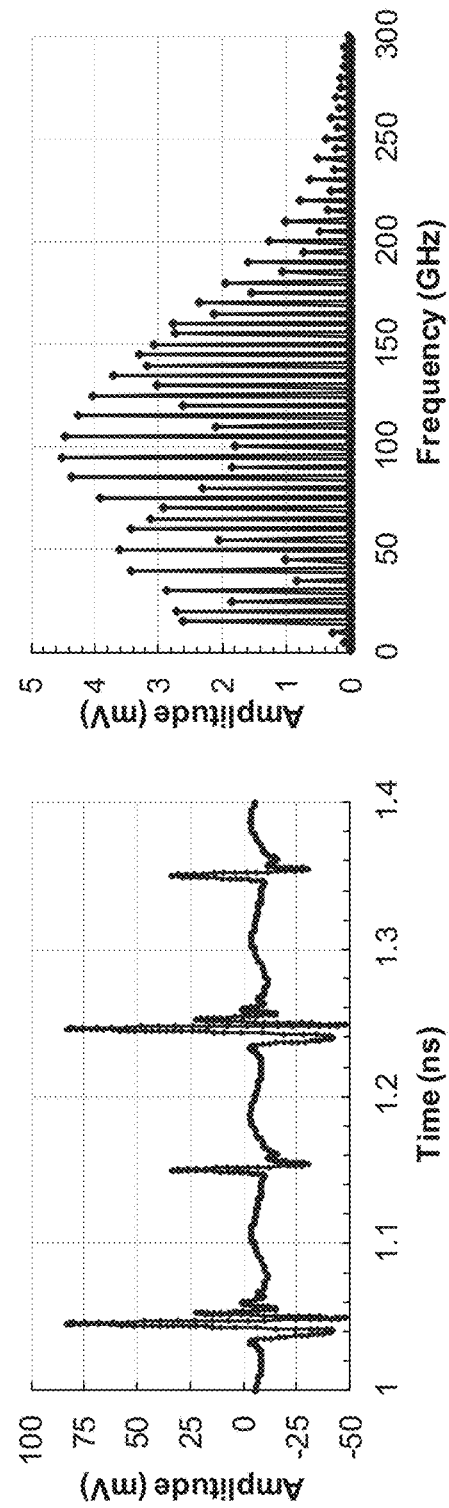
FIG. 4B
FIG. 4C

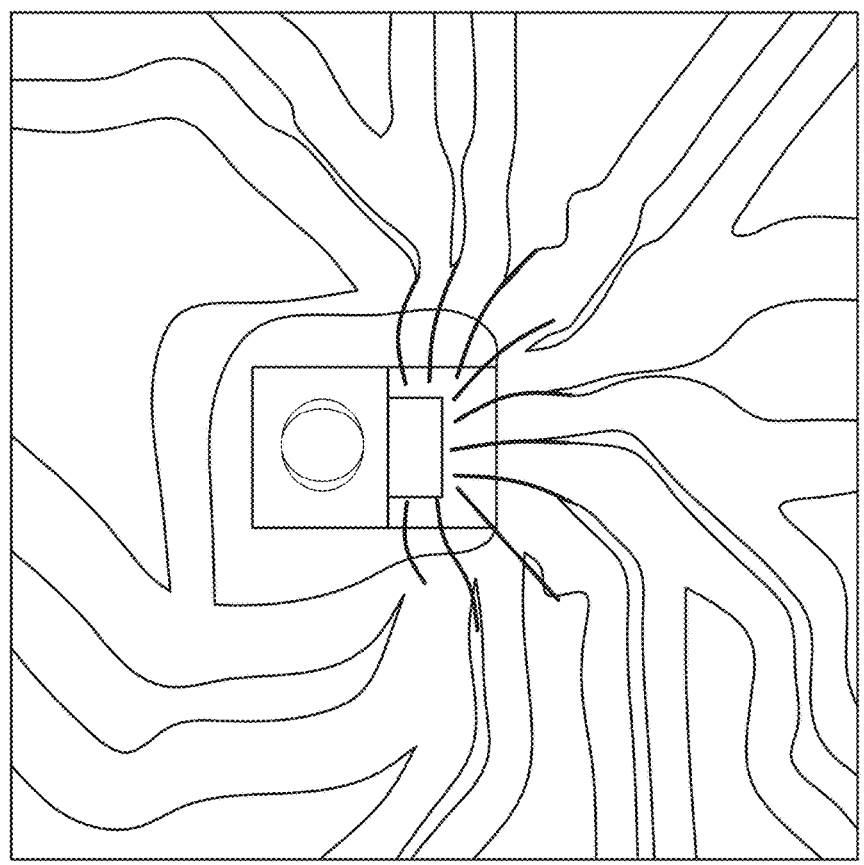
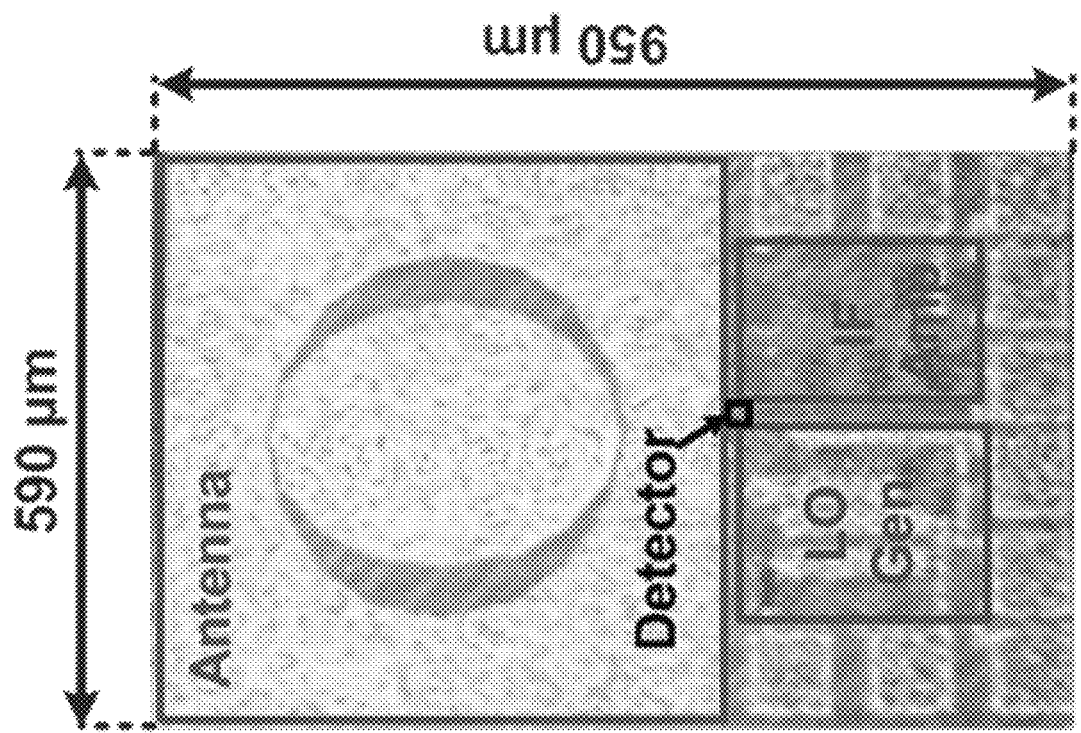
FIG. 8B
FIG. 8A

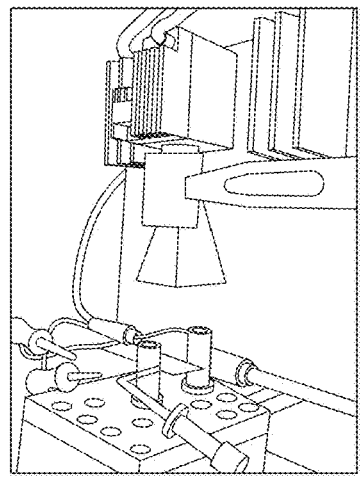
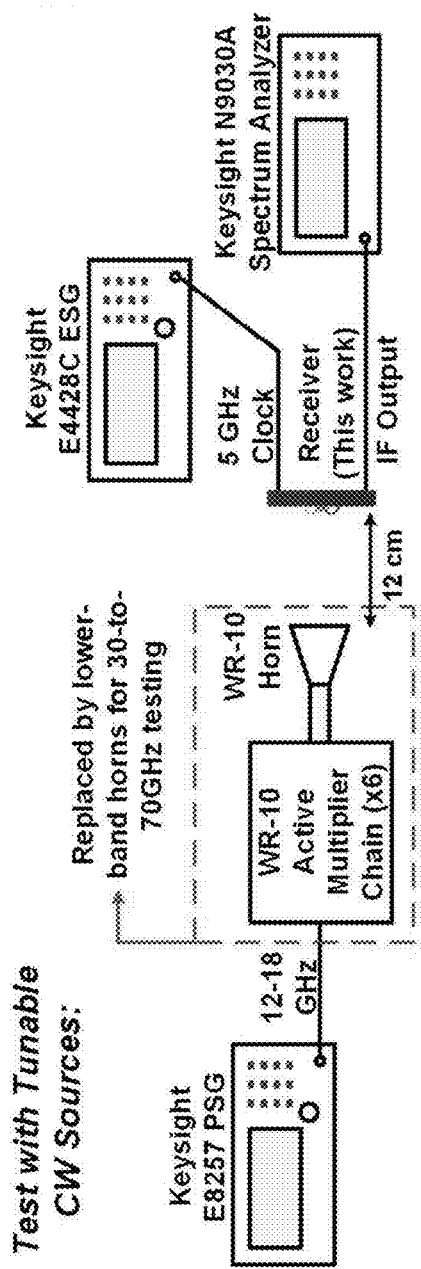
FIG. 9B
FIG. 9A

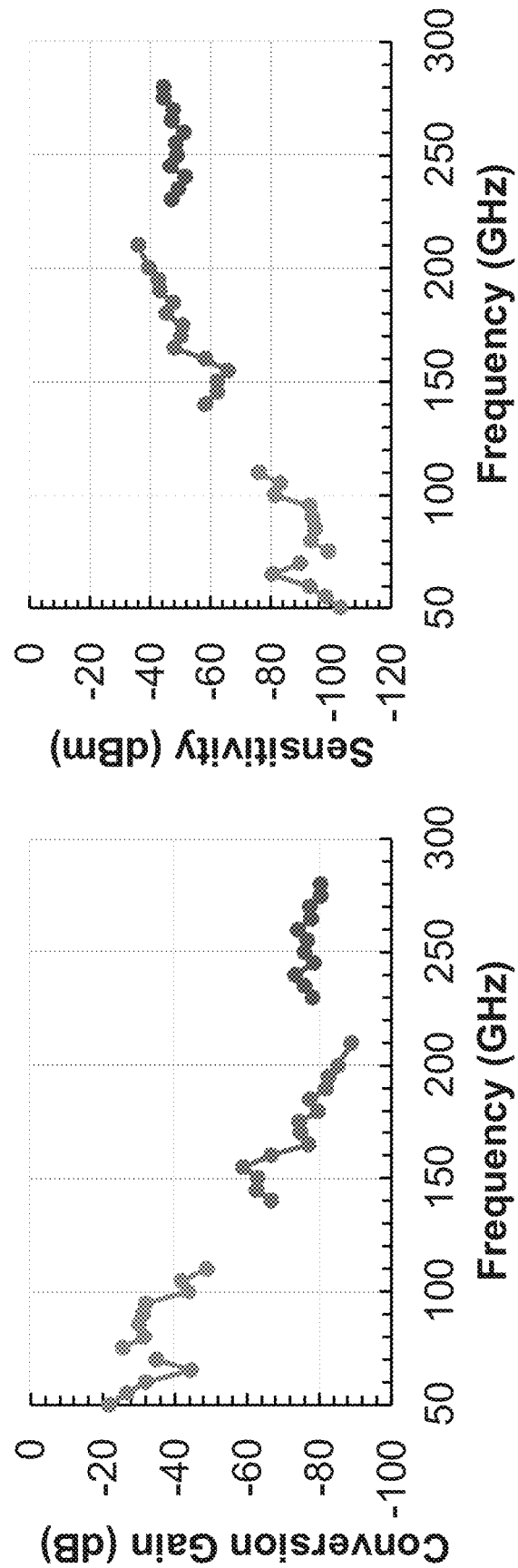

| | Cornell, ISSCC '16 | Princeton, ISSCC '16 | MIT, ISSCC '17 | This Work |
|---|---|---|---|---|
| Process | 130nm SiGe BiCMOS | 130nm SiGe BiCMOS | 65nm CMOS | 65nm CMOS |
| Receiver Method | Coherent (Sub-harmonic) | Spectrum Estimation | Coherent (w/ Frequency Comb) | Coherent (w/ Frequency Comb) |
| Frequency (GHz) | 320 | 40 to 330 | 220 to 320 | 30 to 160* |
| Bandwidth (GHz) | 3.9 | 290 | 100 | 130 |
| Frequency Resolution (Hz) | N/A | 10 M | 380 k | 2 |
| Antenna | On-Chip Patch | On-Chip Log-Periodic | On-Chip Folded Slot | On-Chip Elliptical |
| Area (mm²) | 3.06 (Array of 8) | 4.94 | 6.0 (TX+RX) | 0.56 |
| DC Power (mW) | 117 | 212 | 1700 (TX+RX) | 34 |

FIG. 17

| Classifier | Only 85 GHz | 85 & 95 GHz | All Frequencies |
|---|---|---|---|
| Auto-RBF SVM | 69.8% | 84.0% | 98.8% |
| Gaussian Process | 70.7% | 86.0% | 99.5% |
| Neural Network | 69.2% | 84.2% | 98.3% |
| Naive Bayes | 62.5% | 78.7% | 96.8% |

*FIG. 22*

ELECTRONIC FREQUENCY-COMB DETECTOR

CROSS-REFERENCE TO RELATED APPLICATIONS

The current application is a national stage of PCT Patent Application No. PCT/US2020/015461, entitled "Electronic Frequency-Comb Detector" to Babakhani et al., filed Jan. 28, 2020, which claims priority to U.S. Provisional Patent Application No. 62/798,370, entitled "Broadband Comb-Based Spectrum Sensing" and filed Jan. 29, 2019, and U.S. Provisional Patent Application No. 62/961,471, entitled "Machine-Learning-Assisted Material Classification Using an Electronic Frequency-Comb Detector" and filed Jan. 15, 2020. The disclosures of PCT Patent Application No. PCT/US2020/015461, U.S. Provisional Patent Application Nos. 62/798,370 and 62/961,471 are hereby incorporated by reference herein in their entireties.

STATEMENT OF FEDERALLY SPONSORED RESEARCH

This invention was made with government support under Grant Number 1830123, awarded by the National Science Foundation. The government has certain rights in the invention.

FIELD OF THE INVENTION

The present invention generally relates to frequency-comb detectors, and in particular to electronic frequency-comb detectors.

BACKGROUND

A frequency comb has a spectrum that includes discrete, evenly spaced spectral lines corresponding to electromagnetic frequency values. Sub-harmonic mixers have been used to coherently receive sub-THz signals. High-power local oscillator (LO) signals can be used in these mixers to downconvert the received signal to low frequencies, and multiple voltage-controlled oscillators (VCOs) can be implemented to cover a wide LO frequency range. Frequency-comb detectors have a detection resolution that is defined as the smallest frequency that can be discerned by the frequency-comb detector. Coherent detection means that a receiver can track the phase of a transmitted signal so as to extract any phase and frequency information carried by the transmitted signal.

SUMMARY

Systems and methods in accordance with many embodiments of the invention implement electronic frequency-comb detection systems. In one embodiment, an electronic frequency-comb detection system includes an electronic frequency-comb detector, where the electronic frequency-comb detector includes: a frequency-comb generator configured to generate a frequency comb reference signal; and a heterodyne mixer. In addition, the heterodyne mixer is configured to use the frequency comb reference signal to downconvert received millimeter wave (mm-wave) and terahertz (THZ) frequency tones into an intermediate frequency (IF) signal.

In a further embodiment, the heterodyne mixer includes an N-Channel MOSFET transistor (NFET).

In still a further embodiment, the gate of the NFET is connected to an output of the frequency-comb generator.

In a yet further embodiment, a source of the NFET is configured to receive mm-wave and THZ frequency tones from an on-chip antenna.

In a yet further embodiment again, a gate of the NFET is configured to receive the frequency comb reference signal.

In another embodiment again, the NFET is configured to generate an IF signal at the drain of the NFET.

In a yet further embodiment, the electronic frequency-comb detection system further includes an external clock configured to feed a clock to an input of the frequency-comb generator.

In another embodiment again, the frequency comb reference signal is a local oscillator (LO) signal having a tunable repetition rate.

In another embodiment still, the frequency-comb generator includes a series of inverter stages.

In still a further embodiment, the electronic frequency-comb detection system further includes an IF amplifier.

In another embodiment still, the IF amplifier is configured to feed a spectrum analyzer configured to detect a signature of a material under test (MUT).

In another embodiment, the electronic frequency-comb detection system further includes: a processor, and a memory containing a machine learning classifier application, where the machine learning classifier application configures the processor to classify materials under test based upon inputs received from the spectrum analyzer.

In yet another embodiment, the machine learning classifier application further configures the processor to identify repetitive patterns in recorded data.

In still yet another embodiment again, the machine learning classifier application further configures the processor to monitor at least one of heart rate and breathing rate of a subject.

In a further additional embodiment, the electronic frequency-comb detector further includes an on-chip antenna.

In still a further additional embodiment, the on-chip antenna is an elliptical antenna.

In a still yet further embodiment, the on-chip antenna includes a metasurface layer.

In still yet another embodiment again, the electronic frequency-comb detector is fabricated using a CMOS process.

In a further additional embodiment, an electronic frequency-comb detector includes: a frequency-comb generator with an output, the frequency-comb generator having a plurality of inverter stages; an NFET having its gate connected to the output of the frequency-comb generator; and an IF amplifier having a plurality of amplifier stages, where the frequency-comb generator, the NFET and the IF amplifier, in combination, are configured to downconvert a received radio frequency signal into an IF signal and amplify the IF signal.

In still a further additional embodiment, a method of electronic frequency-comb spectroscopy includes: radiating electromagnetic waves in a direction of a material under test (MUT), wherein the MUT transmits a portion of the electromagnetic waves; generating a reference signal using a frequency-comb generator; receiving the portion of the electromagnetic waves transmitted by the MUT by an on-chip antenna; mixing the portion of the electromagnetic waves received by the on-chip antenna and the reference signal using a mixer to generate an IF signal; amplifying the IF signal using an amplifier to produce an amplified IF signal; feeding the amplified IF signal to a spectrum analyzer; and detecting a signature of the MUT using the spectrum analyzer.

In still yet another embodiment again, the electronic frequency-comb detector can reduce power consumption, increase frequency accuracy, increase precision of linewidth of comb tones, provide large comb bandwidth, and can be miniaturized on a compact integrated circuit chip.

BRIEF DESCRIPTION OF THE DRAWINGS

The disclosed methods and apparatuses, in accordance with various embodiments of the invention, are described with reference to the following figures. The figures are provided for purposes of illustration only and merely depict examples of some embodiments of the disclosed methods and apparatuses. These figures are provided to facilitate the reader's understanding of the disclosed methods and apparatuses. They should not be considered to limit the breadth, scope, or applicability of the presently claimed subject matter. It should be noted that for clarity and ease of illustration these figures are not necessarily made to scale.

FIG. 4A illustrates a circuit diagram of an electronic frequency-comb generator of in accordance with an embodiment of the invention. FIGS. 4B and 4C show the simulated output of the electronic frequency-comb generator of FIG. 4A in time and frequency domains in accordance with an embodiment of the invention.

FIG. 8A shows a die photograph of an electronic frequency-comb detector in accordance with an embodiment of the invention. FIG. 8B shows a photograph of an electronic frequency-comb detector die connected within a semiconductor package in accordance with an embodiment of the invention.

FIG. 9A shows a diagram of a measurement setup for characterizing an electronic frequency-comb detector in accordance with an embodiment of the invention. FIG. 9B shows a photograph of an actual measurement setup for characterizing an electronic frequency-comb detector in accordance with an embodiment of the invention.

FIG. 16A shows conversion loss as a function of frequency for an electronic frequency-comb detector with thinned substrate in accordance with an embodiment of the invention. FIG. 16B shows sensitivity as a function of frequency for an electronic frequency-comb detector with thinned substrate in accordance with an embodiment of the invention.

FIG. 17 illustrates performance of an electronic frequency-comb detector in comparison to previously reported mm-wave/terahertz detectors in accordance with an embodiment of the invention.

FIG. 22 shows a table comparing an average cross-validation accuracy in material classification with different number of frequency points used for training in accordance with an embodiment of the invention.

DETAILED DESCRIPTION

Figure 1:
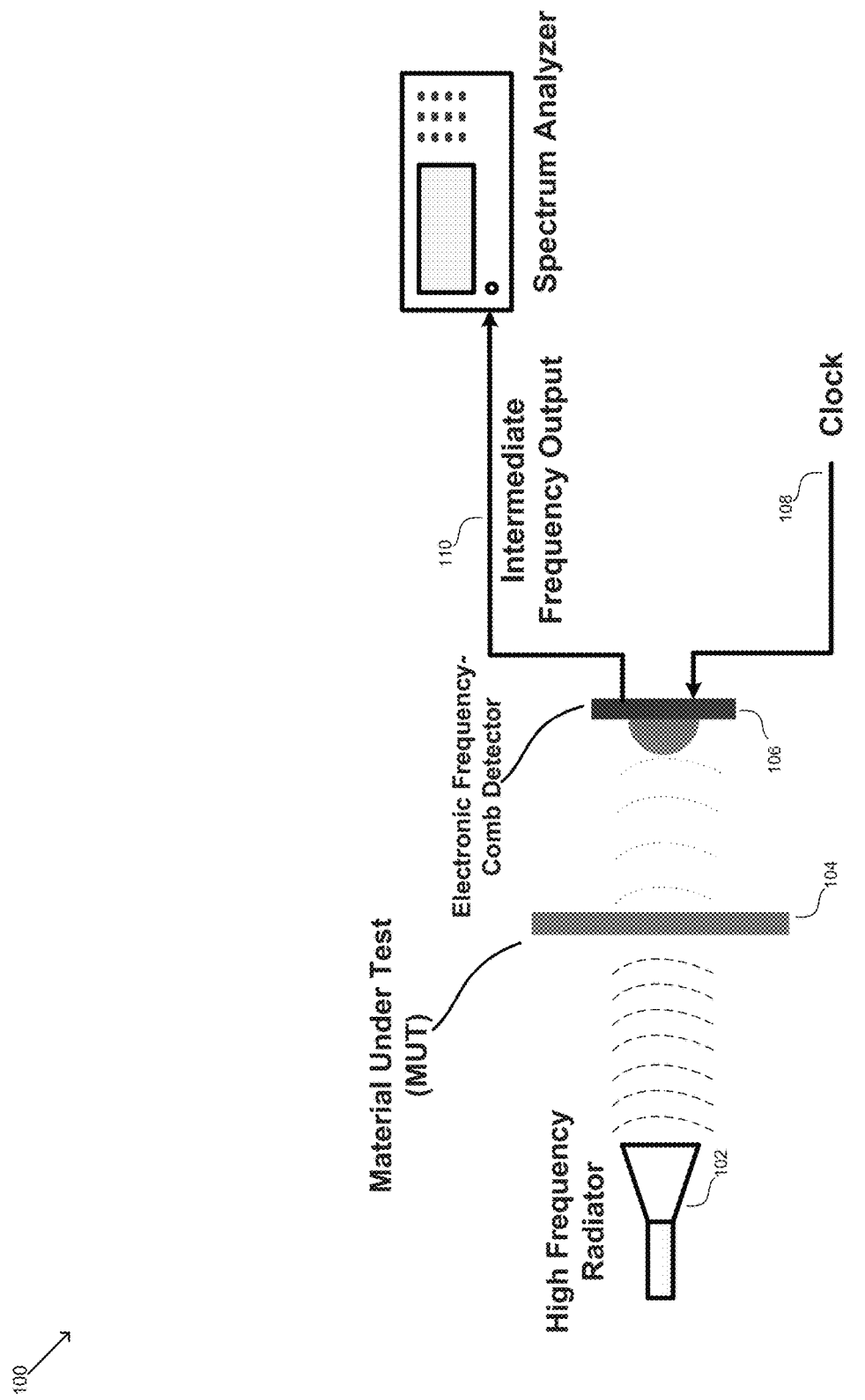
FIG. 1 illustrates an overall system level architecture of an electronic frequency-comb detector utilized in receiving and detecting spectral characteristics of a material under test (MUT) in accordance with an embodiment of the invention.

Turning now to the drawings, systems and methods that utilize electronic frequency-comb detectors in accordance with various embodiments of the invention are illustrated. In many embodiments, electronic frequency-comb detectors are implemented in broadband integrated circuits operating at millimeter wave lengths (mm-wave) and terahertz (THZ) frequencies and can provide low-cost and/or compact solutions for applications such as molecular spectroscopy, material sensing and classification, and hyperspectral imaging. In several embodiments, the electronic frequency-comb detector incorporates a broadband heterodyne detector based on an N-Channel MOSFET transistor (NFET) and utilizes a reference comb signal as a local oscillator (LO) signal for the downconversion of tones into distinct intermediate frequency components. As discussed herein, the heterodyne detector may also be referred to as heterodyne mixer. In certain embodiments, the electronic frequency-comb detector can be integrated on an integrated circuit chip (on-chip) along with a broadband antenna. Further, electronic frequency-comb detectors implemented in this manner described herein can be operated over a wide range of frequencies, for example from 30 to 160 GHz. In other embodiments, any range of frequencies including frequencies below 30 GHz and/or above 160 GHz as appropriate to the requirements of a specific application can be utilized.

In many embodiments, the frequency comb of the electronic frequency-comb detector can be locked to an external signal that sets the tunable repetition rate of the comb. This tunable comb can be used as a frequency ruler to downconvert mm-wave frequency tones to intermediate frequencies (IF). A heterodyne detector, such as an NFET, can mix the received signal with an on-chip frequency comb. In certain embodiments, an on-chip elliptical antenna with a metasurface layer, for example a bottom layer, can receive the radiated signal and feed it into the source of the heterodyne detector. In several embodiments, a topology can be utilized enabling low power consumption and precise tone detection down to small line widths, such as 2 Hz. As those skilled in the art would recognize, having a precise small line width can allow for reduction of the detection resolution. Electronic frequency-comb detectors and methods of detection in accordance with various embodiments of the invention can coherently detect frequency tones from 30 to 160 GHz with precise tone detection down to small line widths while having low power consumption.

In many embodiments, electronic frequency-comb detectors can be employed in high-resolution mm-wave sensing and material classification. In several embodiments, electronic frequency-comb detectors can be utilized in spectroscopy applications. Moreover, various embodiments of the invention can be employed for frequency comb generation, and for heterodyne detection utilized in broadband coherent detectors in the THz range. In addition, coherent receivers in accordance with many embodiments of the invention can be utilized to extract frequency content of THz signals in hyper-spectral imaging systems or trace-gas spectrometers.

In some embodiments, an electronic frequency-comb detector can be employed along with one or more machine learning systems to classify and identify different materials using their measured transmittance values over a wide range of frequencies, for example from 75 to 110 GHz. In other embodiments, any range of frequencies including frequencies below 75 GHz and/or above 110 GHz as appropriate to the requirements of a specific application can be utilized. In certain embodiments, the receiver includes a mm-wave frequency-comb which provides tunability and allows for recordation of numerous data points across a wide range of frequencies. As those skilled in the art recognize, this capability can enhance the accuracy in classification of materials by reducing the number of false detections.

In many embodiments, the electronic frequency-comb detector can be a coherent detector that utilizes non-linear high-speed switches to generate a broadband mm-wave frequency comb with tunable spacing. As is discussed further below, any of a variety of frequency-comb detector implementations can be utilized as appropriate to the requirements of specific applications in accordance with various embodiments of the invention.

Electronic frequency-comb detectors and methods for frequency-comb detection in accordance with various embodiments of the invention are disclosed further below.

Systems Incorporating Electronic Frequency-Comb Detectors

Electronic frequency-comb detectors can be utilized in spectroscopy and in material classification applications, among others. Spectroscopy and/or material classification systems in accordance with many embodiments of the invention can use an electronic frequency-comb detector to detect electromagnetic waves transmitted by a signal radiator towards a subject material. In many embodiments of the invention, electromagnetic waves received by the electronic frequency-comb detector can then be downconverted using a local oscillator signal. The downconverted signal can subsequently be fed into a spectrum analyzer in order to detect the signature of a material under test.

A material classification system including an electronic frequency-comb detector that can be utilized to identify spectral characteristics of a material under test (MUT) in accordance with an embodiment of the invention is illustrated in FIG. 1. The classification system 100 includes a signal radiation source 102, which can radiate electromagnetic waves in the direction of a MUT 104. The electromagnetic waves transmitted through the MUT can then be received by an electronic frequency-comb detector 106. The electronic frequency-comb detector can utilize a clock 108 to generate a local oscillator (LO) signal, which can then be employed to generate an intermediate frequency (IF) signal 110. The IF signal 110 can then be fed to a spectrum analyzer, which can measure the magnitude of the IF input signal versus frequency. The measurement data can then be provided to a computer, which can use the measurement data to identify the MUT.

While specific systems incorporating electronic frequency-comb detectors are described above with reference to FIG. 1, any of a variety of systems can be utilized to perform imaging, and/or analyze materials using THz frequencies as appropriate to the requirements of specific applications in accordance with various embodiments of the invention. Electronic frequency-comb detectors in accordance with a number of embodiments of the invention that detect THz signals are discussed further below.

Electronic Frequency-comb Detectors

Figure 2A:
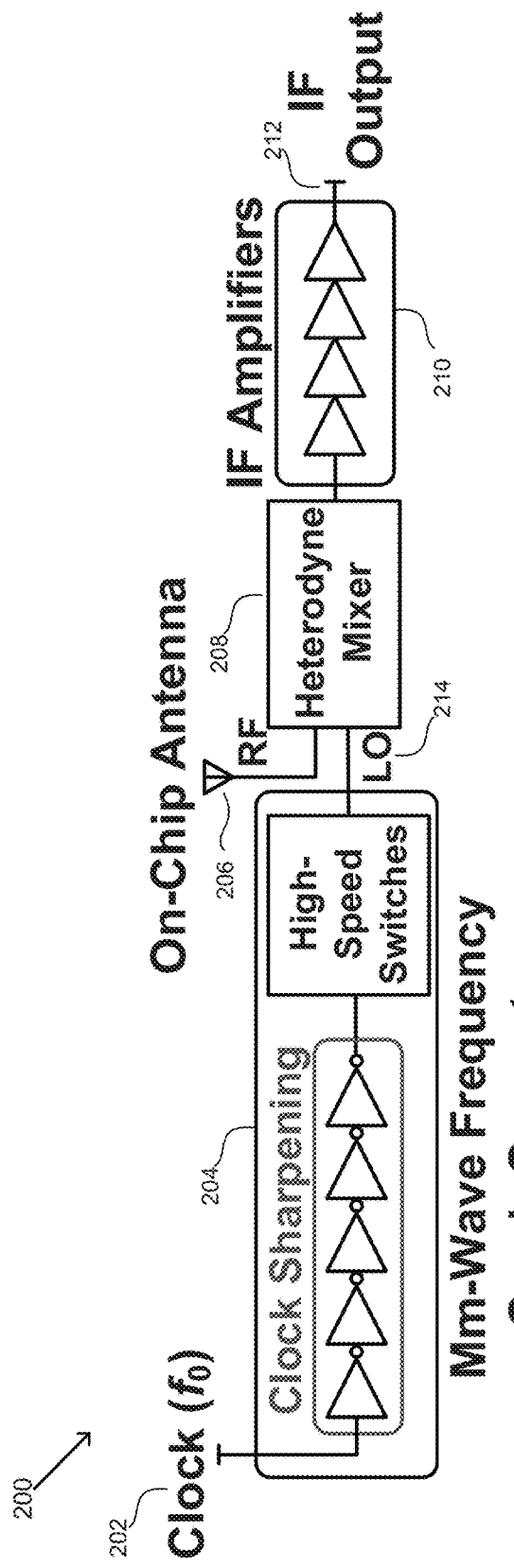
FIG. 2A illustrates an architecture of an electronic frequency-comb detector in accordance with an embodiment of the invention.
Figure 2B:
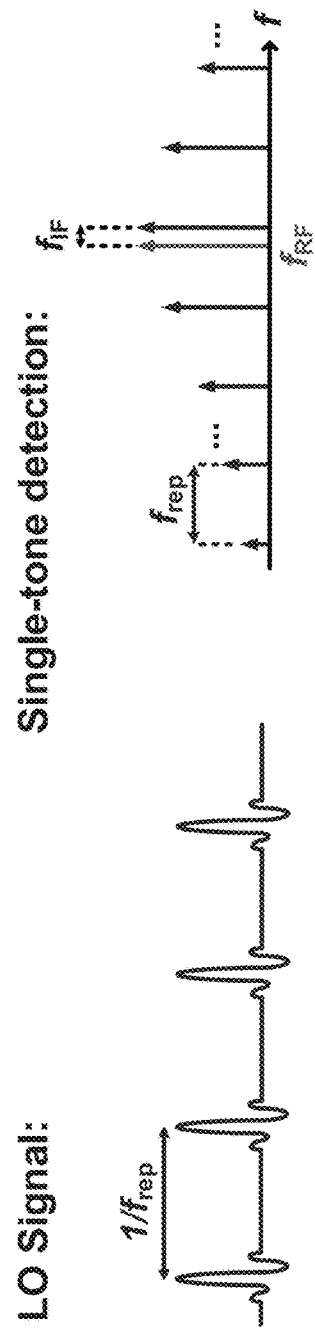
FIG. 2B illustrates utilization of an LO signal in mixing with an RF signal, and a resulting an IF signal in accordance with an embodiment of the invention.

Electronic frequency-comb detectors in accordance with many embodiments of the invention can receive an RF signal and downconvert it to an intermediate frequency (IF) signal. In several embodiments, the resulting IF signal can be used by a spectrum analyzer to detect characteristics of a MUT. An electronic frequency-comb detector architecture in accordance with an embodiment of the invention is illustrated in FIG. 2A. In several embodiments, an electronic frequency-comb detector 200 can receive an external clock 202. In several embodiments, the clock frequency ($f_{rep}$) can be tuned from low frequencies (e.g., frequencies from 100 MHz among others) up to higher frequencies (e.g., for example, up to 6 GHz, among others), which can be fed to the input of a frequency-comb generator 204 in order to generate a LO 214, which has a tunable repetition rate. The external clock 202 can set the repetition rate of the LO signal. In certain embodiments, a series of inverter stages within the frequency-comb generator may sharpen the clock signal to drive high-speed switches. In many embodiments, the LO frequency can be tuned to a wide range of frequencies, for example from 100 MHz up to 6 GHz. In other embodiments, any range of frequencies including frequencies below 100 MHz and/or above 6 GHz as appropriate to the requirements of a specific application can be utilized. The LO signal 214 can be utilized as a reference signal to downconvert a RF signal received by the antenna 206 using a heterodyne mixer 208. The output of the heterodyne mixer 208 can then be amplified by a block of IF amplifiers 210, producing an IF signal at node 212. FIG. 2B illustrates utilization of the LO signal 214 in mixing with the RF signal, and a resulting IF signal in accordance with an embodiment of the invention.

While specific electronic frequency-comb detector architectures are described above with reference to FIGS. 2A and 2B, any of a variety of electronic frequency-comb detector architectures can be utilized as appropriate to the requirements of specific applications in accordance with various embodiments of the invention. Electronic frequency-comb detector circuits in accordance with a number of embodiments of the invention that can be utilized to detect THz signals are discussed further below.

Electronic Frequency-Comb Detector Circuit

Figure 3:
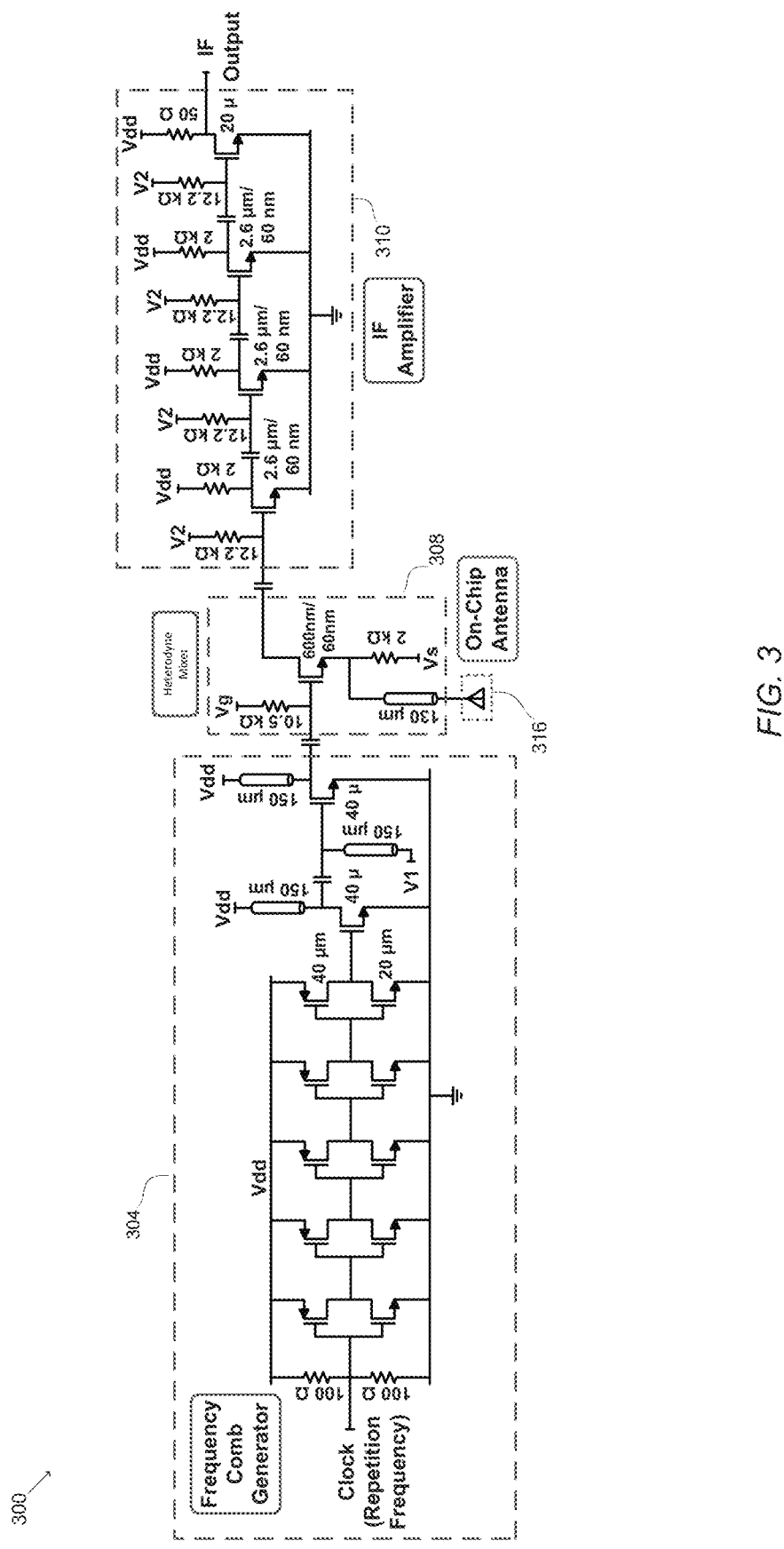
FIG. 3 illustrates a circuit diagram of an electronic frequency-comb detector in accordance with an embodiment of the invention.

An electronic frequency-comb detector circuit in accordance with an embodiment of the invention is illustrated in FIG. 3. The illustrated electronic frequency-comb detector circuit can be an implementation of the electronic frequency-comb detector architecture shown in FIG. 2A.

In many embodiments, the illustrated electronic frequency-comb detector circuit 300 can include a frequency-comb generator 304, a heterodyne mixer 308, an on-chip antenna 316, and an IF amplifier 310. In several embodiments, an external clock can be fed to the input of the frequency-comb generator circuit to set a repetition rate of the frequency-comb generator. In certain embodiments, a series of inverter stages may sharpen the clock signal to drive a fast switching transistor loaded with a 150-μm transmission line. In other embodiments, any range of transmission lines including transmission lines below 150-μm or above 150-μm as appropriate to the requirements of a specific application can be utilized. The spacing between the tones generated by the frequency-comb generator may be equal to the repetition rate. In many embodiments, a reference signal generated by the frequency-comb generator LO can be used as a tunable frequency ruler to downconvert received frequency tones in a wide bandwidth. In certain embodiments, when another frequency comb with a slightly different repetition rate ($f_{rep}+\Delta f$) is received by the on-chip antenna, a low-frequency intermediate frequency (IF) comb with a repetition rate of $\Delta f$ can be generated by mixing the radio frequency (RF) and LO signals. In several embodiments, an NFET with W/L=10 can be directly connected to the feed of the on-chip antenna to be used as a heterodyne detector. In other embodiments, any range of ratio of W/L including ratios below or above 10 as appropriate to the requirements of a specific application can be utilized. The received signal from the antenna can be fed to the source of the NFET and the frequency-comb generator LO reference signal can be fed to the gate of the NFET. These two mm-wave/THz waves can modulate the gate-to-source voltage of the NFET, which in turn can produce an IF signal at the drain of the NFET. This IF signal can then be amplified using an IF amplifier.

While specific electronic frequency-comb detector circuits are described above with reference to FIG. 3, any of a variety of electronic frequency-comb detector circuits can be utilized as appropriate to the requirements of specific applications in accordance with various embodiments of the invention. Electronic frequency-comb generator circuits in accordance with a number of embodiments of the invention are discussed further below.

Frequency-Comb Generator Circuit

An electronic frequency-comb generator circuit in accordance with an embodiment of the invention is illustrated in FIG. 4A. The illustrated electronic frequency-comb generator circuit can be utilized in an implementation of the electronic frequency-comb detector architecture shown in FIG. 2A. In many embodiments, the illustrated electronic frequency-comb generator circuit can generate a frequency comb. The frequency comb in this system can be generated by fast switching of a transistor. In several embodiments, a series of inverter stages sharpen the clock signal at the input by reducing the rise and fall times of the signal which sets the repetition frequency of the frequency comb. Two stages of switching transistors with transmission line loads follow the inverters chain. In certain embodiments, the first switch is turned on and off by the clock signal to generate voltage spikes for driving a fast switching transistor loaded with a 150-μm transmission line. In other embodiments, any range of transmission lines including transmission lines below 150-μm or above 150-μm as appropriate to the requirements of a specific application can be utilized. The fast switching that occurs at the rising edge of the clock can generate a short impulse with a broadband comb-shaped spectrum centered at 120 GHz. In other embodiments, any range of frequencies including frequencies below or above 120 GHz as appropriate to the requirements of a specific application can be utilized. In many embodiments, the frequency comb generated by the electronic frequency-comb generator circuit can be utilized as a reference tunable frequency ruler LO to downconvert received frequency tones over a wide bandwidth. FIGS. 4B and 4C illustrate a simulated output of the electronic frequency-comb generator of FIG. 4A in time and frequency domains in accordance with an embodiment of the invention.

While specific electronic frequency-comb generator circuits are described above with reference to FIGS. 4A, 4B and 4C, any of a variety of electronic frequency-comb generator circuits can be utilized as appropriate to the requirements of specific applications in accordance with various embodiments of the invention. Heterodyne detector and IF amplifier circuit in accordance with a number of embodiments of the invention are discussed further below.

Heterodyne Detector and IF Amplifier Circuit

Figure 5B:
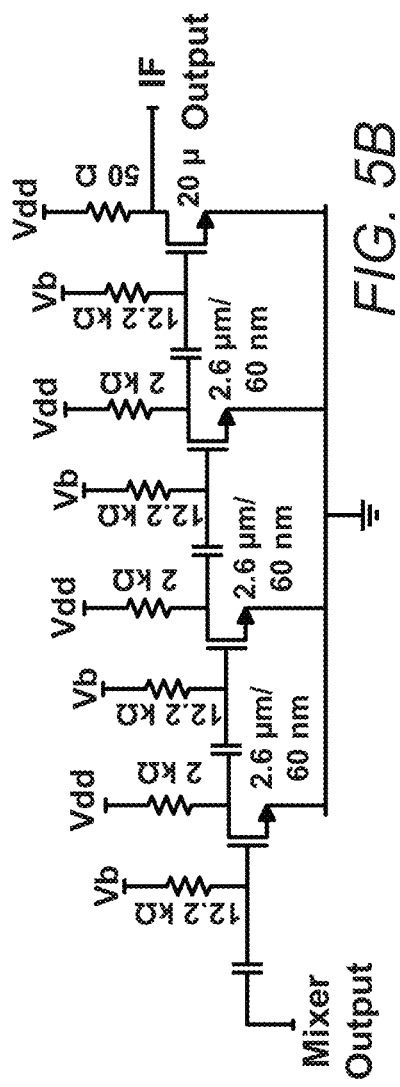
FIG. 5B illustrates a circuit diagram of IF amplifier within an electronic frequency-comb detector in accordance with an embodiment of the invention.
Figure 5C:
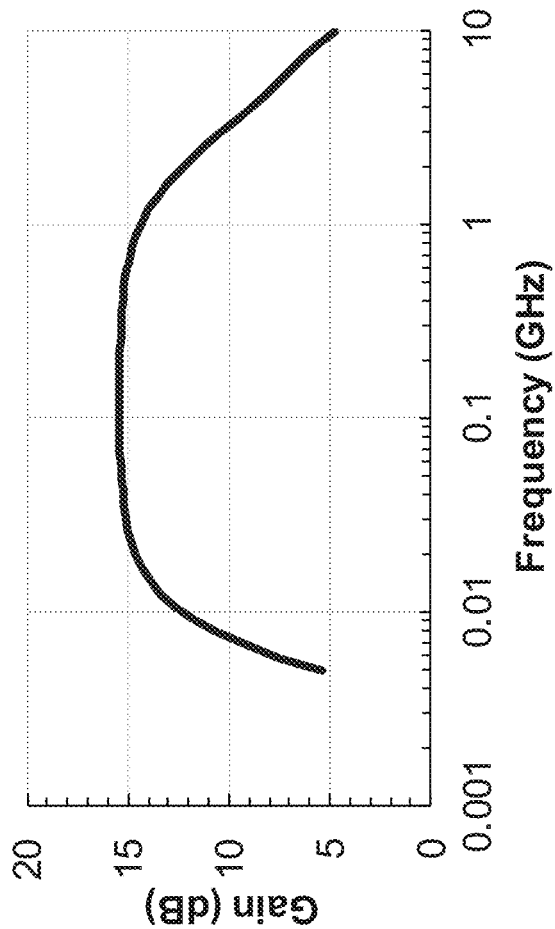
FIG. 5C shows gain of the IF amplifier of FIG. 6B as a function of frequency in accordance with an embodiment of the invention.
Figure 5A:
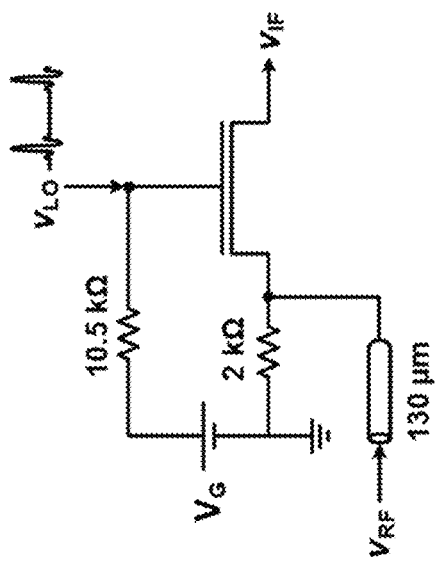
FIG. 5A illustrates a circuit diagram of a heterodyne mixer that can be utilized within an electronic frequency-comb detector in accordance with an embodiment of the invention.

An electronic heterodyne detector circuit in accordance with an embodiment of the invention is illustrated in FIG. 5A. The illustrated electronic heterodyne detector circuit can be utilized in an implementation of the electronic frequency-comb detector architecture shown in FIG. 2A. In many embodiments, the illustrated electronic heterodyne detector circuit can be an NFET that can be directly connected to the feed of an on-chip antenna. In certain embodiments, a received signal from the antenna $V_{RF}$ is fed to the source, and a $V_{LO}$ signal is fed to the gate of the NFET. These two mm-wave/THz signals modulate the gate-to-source voltage of the NFET, which in turn can produce an IF signal between the NFET's drain and source. This mixing operation is based on the non-linearity of the device and resistive mixing observed in NFET channel in the mm-wave/THz regime. Incoming waves can be detected up to frequencies higher than $f_{max}$ of the NFET by exciting carrier density waves in the NFET channel. This detection mechanism can be exploited for heterodyne detection where there is a frequency difference between the gate and source signals. The IF signal is then amplified using an IF amplifier in accordance with an embodiment of the invention as illustrated in FIG. 5B. FIG. 5C illustrates gain of the IF amplifier of FIG. 5B as a function of frequency in accordance with an embodiment of the invention.

While specific electronic heterodyne detector and IF amplifier circuits are described above with reference to FIGS. 5A, 5B and 5C, any of a variety of electronic heterodyne detector and IF amplifier circuits can be utilized as appropriate to the requirements of specific applications in accordance with various embodiments of the invention. Dual comb detection in accordance with a number of embodiments of the invention is discussed further below.

Dual Comb Detection

Figure 6A:
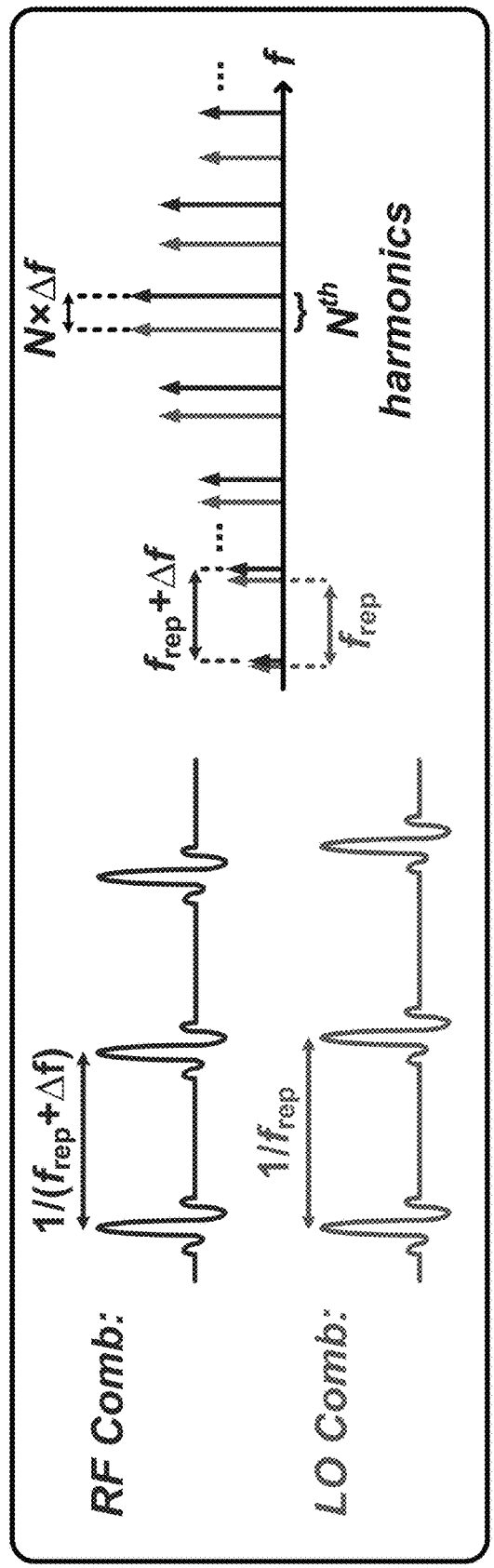
FIG. 6A illustrates a dual-comb detection technique in accordance with an embodiment of the invention. A frequency domain representation of a radio frequency (RF) comb and a local oscillator (LO) comb are illustrated along with a mixing of the RF and LO combs in accordance with an embodiment of the invention.
Figure 6B:
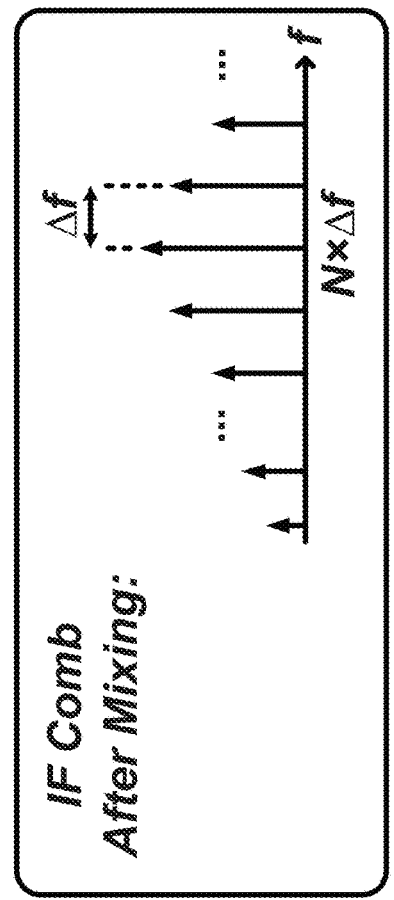
FIG. 6B illustrates the resultant intermediate frequency (IF) comb in accordance with an embodiment of the invention.

A dual comb detection method in accordance with an embodiment of the invention is illustrated in FIG. 6A. In certain embodiments, dual comb detection can be performed by changing slightly a repetition rate of a LO. In many embodiments, an electronic frequency-comb detector can receive an electromagnetic wave transmitted through a MUT and a directly transmitted LO comb, and mix the two signals in order to extract high frequency content into IF frequencies, as is illustrated in FIG. 6B.

While specific dual comb detection methods are described above with reference to FIGS. 6A and 6B, any of a variety of dual comb detection methods can be utilized as appropriate to the requirements of specific applications in accordance with various embodiments of the invention. On-chip elliptical antennas in accordance with a number of embodiments of the invention that can be utilized to detect THz signals are discussed further below.

On-Chip Elliptical Antennas

Figures 7A, 7B, 7C:
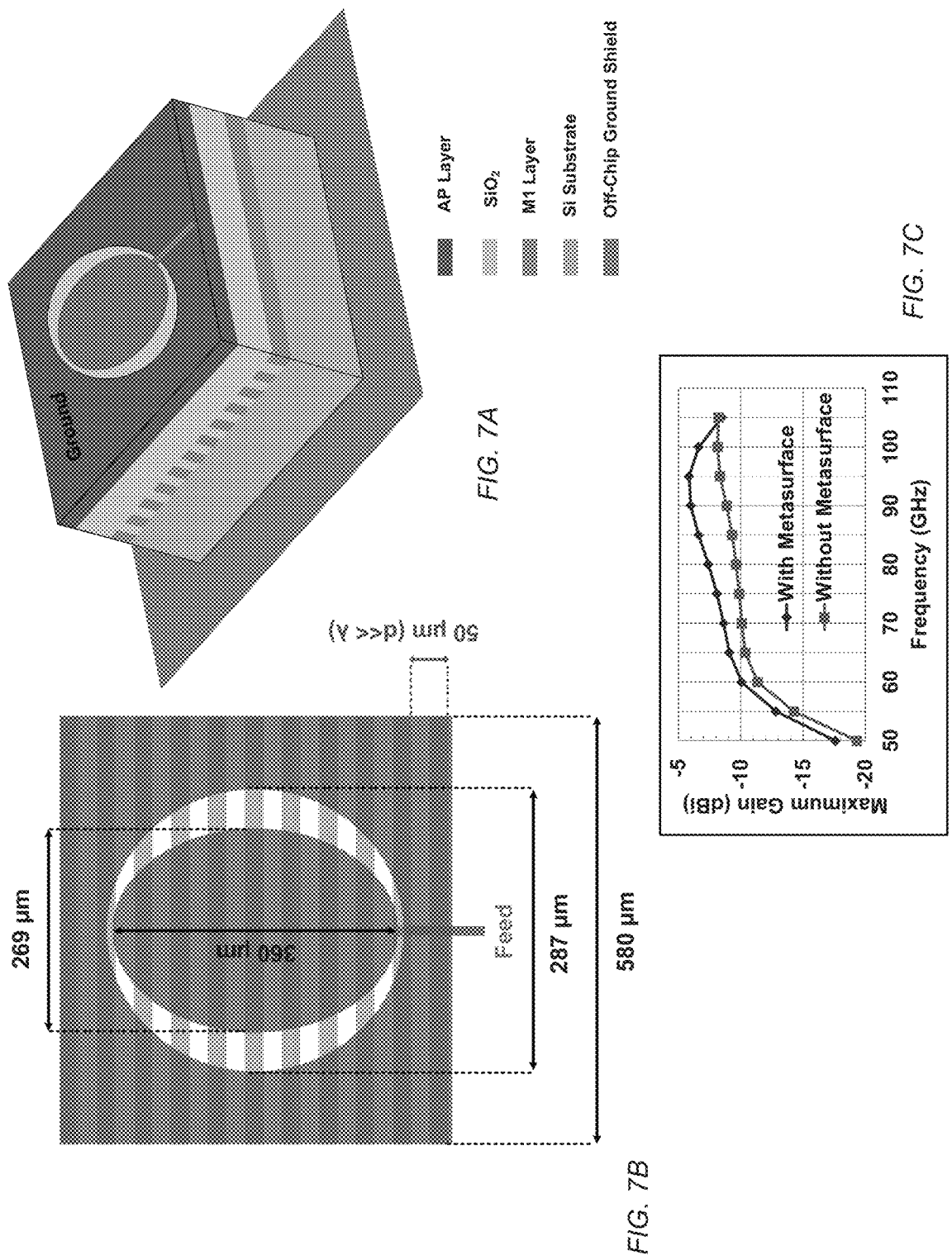
FIG. 7A shows an illustration of an on-chip elliptical antenna in accordance with an embodiment of the invention.
FIG. 7B shows an illustration of a top view of the on-chip elliptical antenna of FIG. 7A in accordance with an embodiment of the invention.
FIG. 7C shows a graph of gain of the elliptical antenna of FIG. 7A as a function of frequency in accordance with an embodiment of the invention.

An on-chip elliptical antenna in accordance with an embodiment of the invention is illustrated in FIG. 7A. A top view of the on-chip elliptical antenna of FIG. 7A in accordance with an embodiment of the invention is illustrated in FIG. 7B. In several embodiments, an elliptical antenna can be implemented on an integrated chip (chip) to receive frequency tones in a broad frequency range. In certain embodiments, a periodic metasurface structure is implemented on a first metal layer to enhance the directivity of the on-chip antenna by acting as a high-impedance surface. In many embodiments, a metasurface is utilized in order to create the on-chip elliptical antenna. A metasurface is a periodic planar structure in which a pattern's period is smaller than the period of the operating wavelength. Metasurfaces can exhibit small refractive index and high impedance in certain frequencies. In many embodiments, a periodic metasurface structure can be implemented in metal1 (M1) layer to enhance the gain of the on-chip antenna by acting as a high-impedance surface. This structure may improve the efficiency by hindering the propagation of the surface waves in the lossy silicon substrate. In certain embodiments, several stripes made of copper are implemented on the bottom layer of the metal stack to improve antenna efficiency by hindering the propagation of surface waves in lossy silicon substrate. A graph of gain of the on-chip elliptical antenna of FIG. 7A as a function of frequency in accordance with an embodiment of the invention is illustrated in FIG. 7C. The on-chip elliptical antenna gain improvement after using the metasurface is clear in FIG. 7C.

While specific on-chip elliptical antennas are described above with reference to FIGS. 7A, 7B and 7C, any of a variety of on-chip elliptical antennas can be utilized as appropriate to the requirements of specific applications in accordance with various embodiments of the invention. Electronic frequency-comb detector die fabrication in accordance with a number of embodiments of the invention that can be utilized to detect THz signals are discussed further below.

Die Fabrication

In many embodiments, the electronic frequency-comb detector can be fabricated in a CMOS process. A die photograph of an electronic frequency-comb detector in accordance with an embodiment of the invention is illustrated in FIG. 8A. A photograph of an electronic frequency-comb detector die with connections within a semiconductor package in accordance with an embodiment of the invention is illustrated in FIG. 8B. Those skilled in the art will recognize that the electronic frequency-comb detector can be fabricated in other processes and are not limited to fabrication using CMOS processes.

While specific electronic frequency-comb detector die fabrication on-chip are described above with reference to FIGS. 8A and 8B, any of a variety of electronic frequency-comb detector die fabrication can be utilized as appropriate to the requirements of specific applications in accordance with various embodiments of the invention. Experimental measurements of electronic frequency-comb detectors in accordance with a number of embodiments of the invention are discussed further below.

Experimental Measurements of Electronic Frequency-Comb Detectors

In many embodiments, in order to characterize the performance of the electronic frequency-comb detector over a wide frequency range, multiple signal sources can be used as illustrated in FIG. 9A. In particular, FIG. 9A illustrates measurement setups for characterizing a spectrum analyzer with tunable continuous wave (CW) sources as well as a mm-wave frequency comb radiator in accordance with an embodiment of the invention. As illustrated in FIG. 9A, a Keysight PSG connected to standard horn antennas can radiate CW signals up to 70 GHz. A multiplier connected to a horn antenna may radiate CW signals from 75 to 110 GHz. These CW sources can be used with an electronic frequency-comb detector chip to observe the IF output when the CW tone is mixed with its adjacent tones. In several tests, gate-to-source of the NFET is set to 0.46 V. A photograph of an actual measurement setup for characterizing an electronic frequency-comb detector in accordance with an embodiment of the invention is shown in FIG. 9B.

Figure 10:
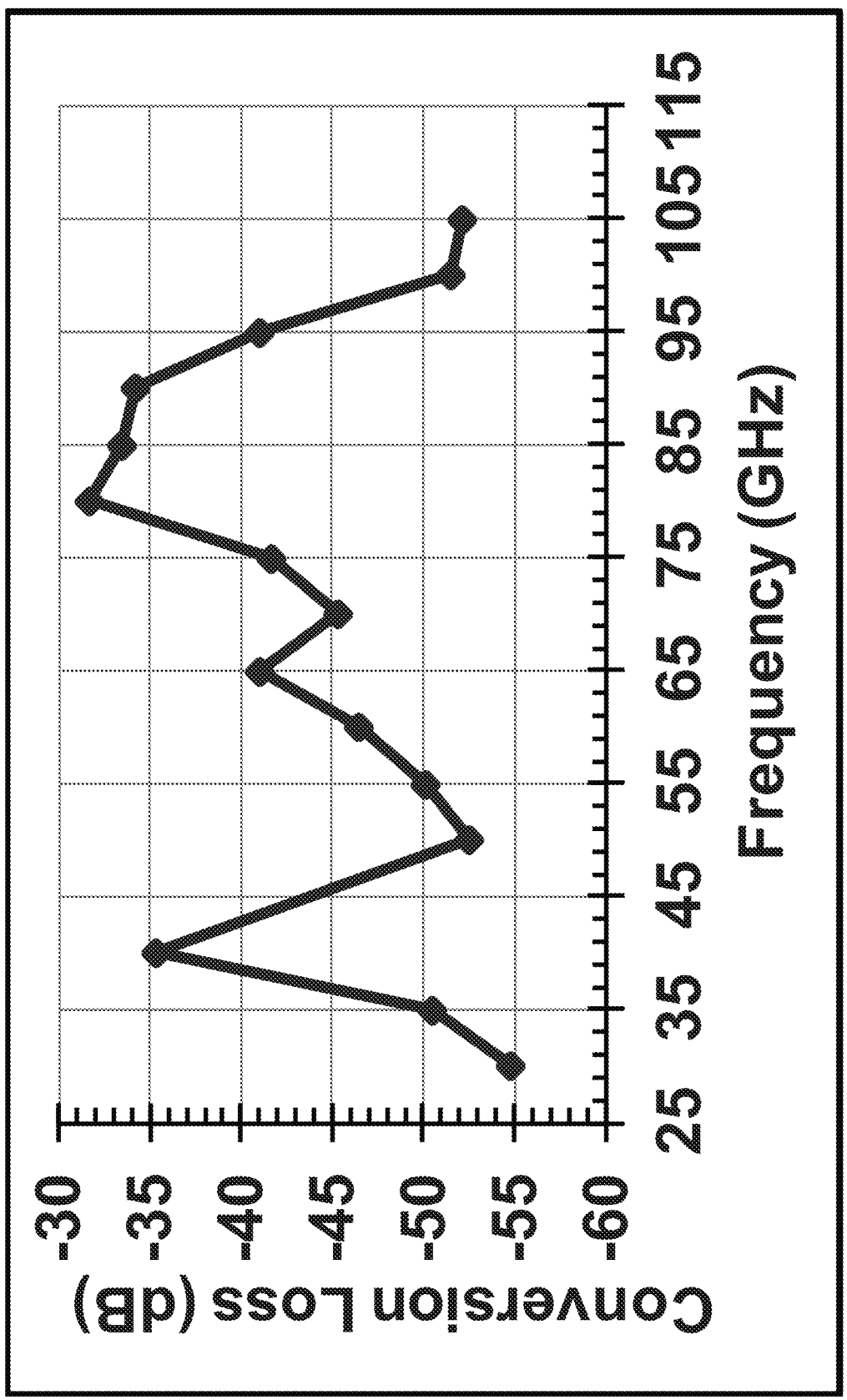
FIG. 10 shows measured conversion loss of an electronic frequency-comb detector in accordance with an embodiment of the invention.
Figure 11:
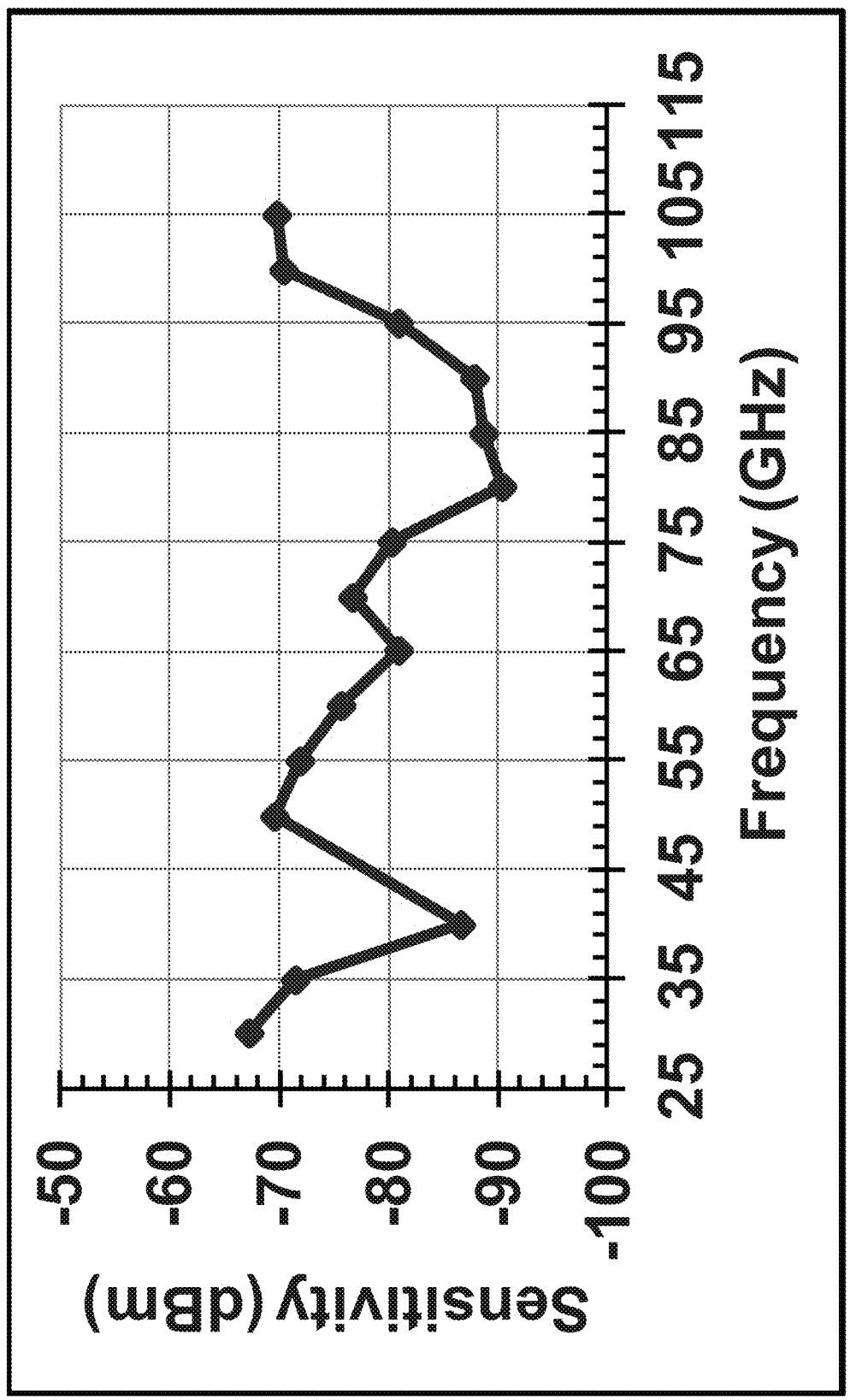
FIG. 11 shows calculated input sensitivity for an electronic frequency-comb detector based on measured conversion loss and minimum detectable IF power in accordance with an embodiment of the invention.
Figure 12:
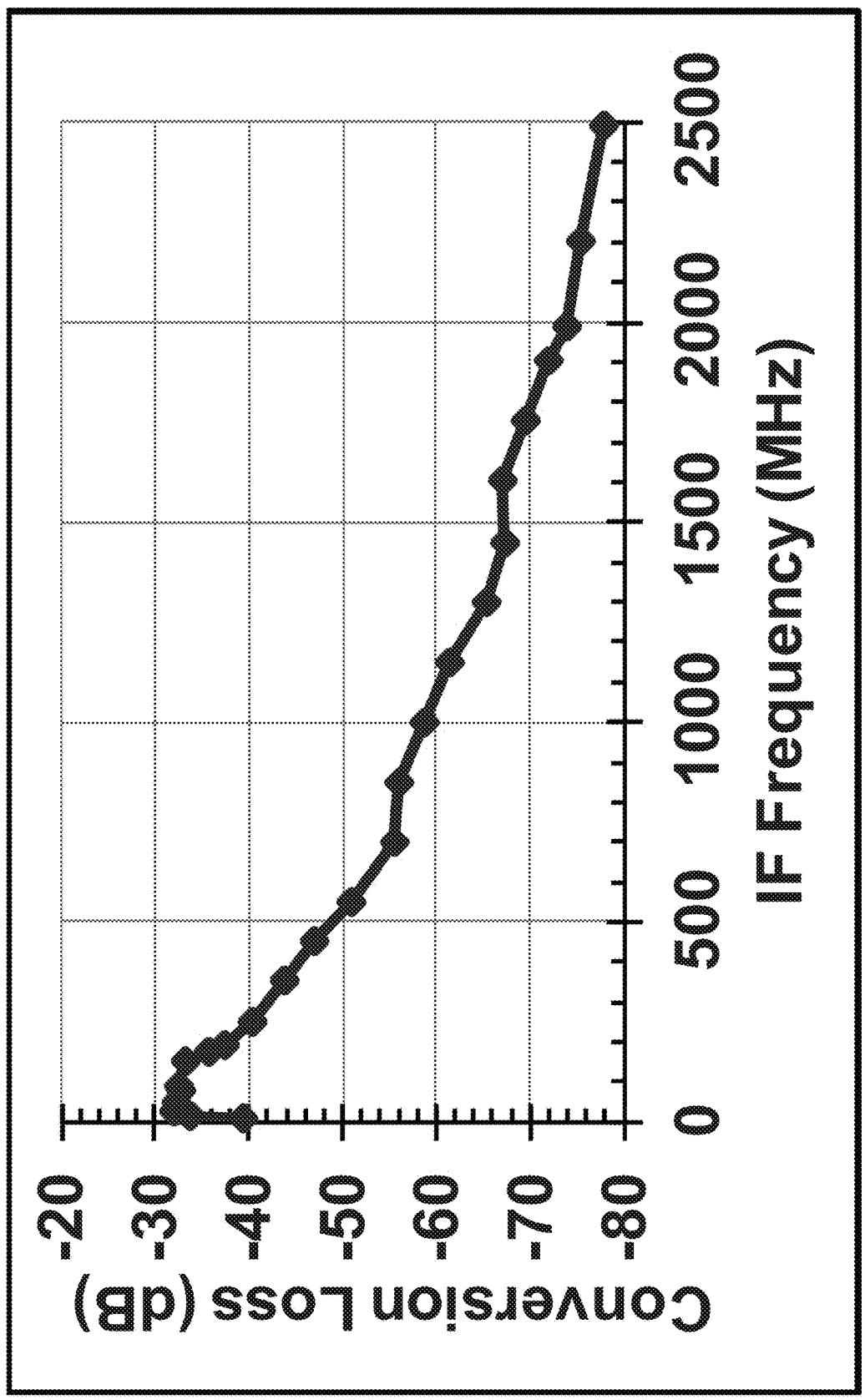
FIG. 12 shows measured conversion loss of an electronic frequency-comb detector as a function of IF frequency in accordance with an embodiment of the invention.
Figure 13:
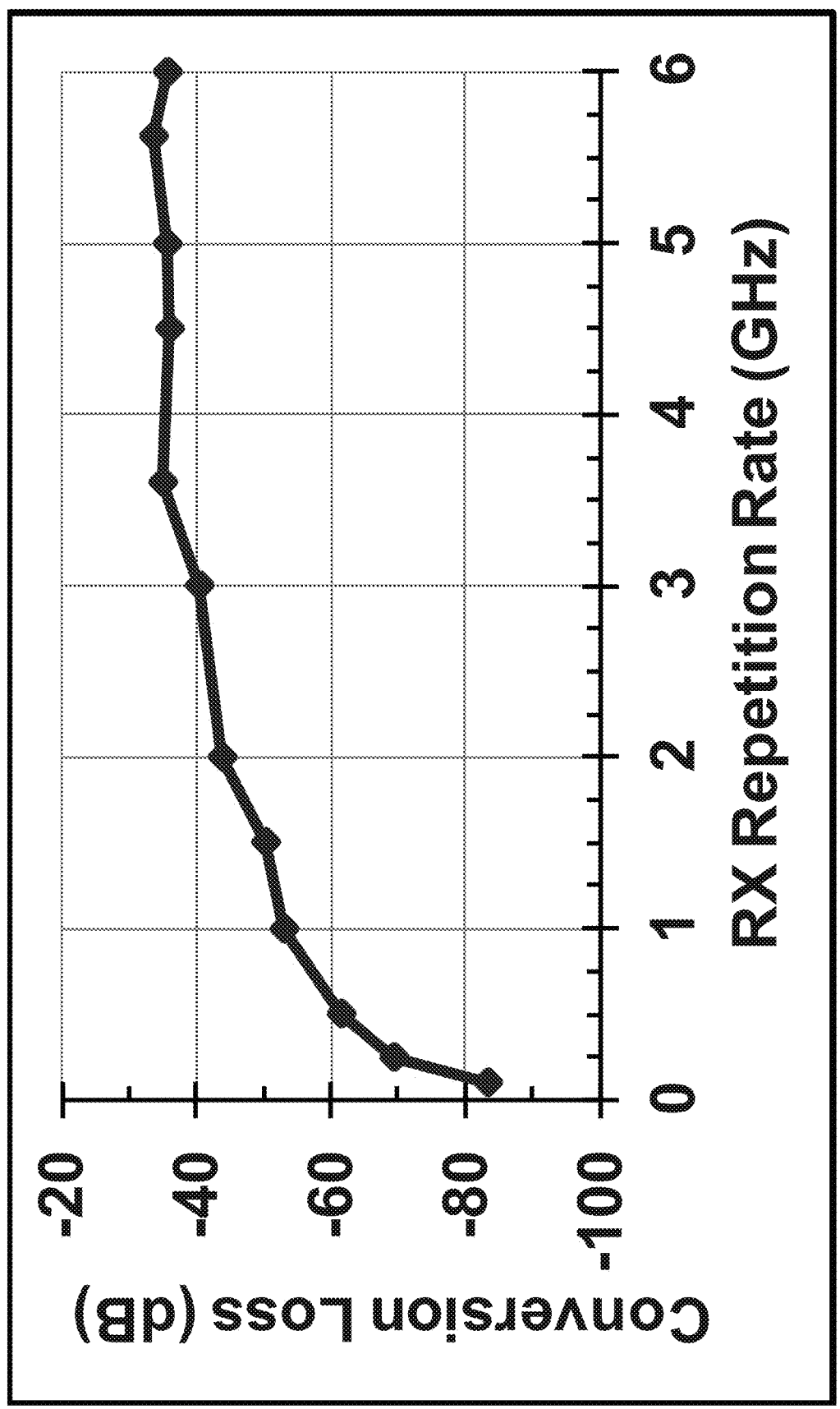
FIG. 13 shows measured conversion loss of an electronic frequency-comb detector as a function of frequency comb spacing (repetition rate) in accordance with an embodiment of the invention.

Measurement results of the CW test in accordance with an embodiment of the invention are shown in FIGS. 10, 11, 12 and 13. FIG. 10 shows measured conversion loss of an electronic frequency-comb detector in accordance with an embodiment of the invention with a fixed value for $f_{IF}$ and varying $f_{RF}$. FIG. 11 shows calculated input sensitivity for an electronic frequency-comb detector based on measured conversion loss and minimum detectable IF power in accordance with an embodiment of the invention. The conversion loss and sensitivity calculations can be based on the Friis transmission equation, measured output power, transmit power, and horn antenna gain. The conversion loss values may also include the on-chip antenna gain. The sensitivity of the electronic frequency-comb detector can be limited by the minimum detectable IF output. This value may be the output noise floor of the electronic frequency-comb detector, for example −122 dBm. FIG. 12 shows measured conversion loss of an electronic frequency-comb detector as a function of IF frequency in accordance with an embodiment of the invention. The repetition rate ($f_{rep}$) of an electronic frequency-comb detector may be swept to verify LO tunability. As $f_{rep}$ gets smaller, the power may spread into more tones so the power of each LO tone and the conversion gain get smaller. FIG. 13 shows measured conversion loss of an electronic frequency-comb detector as a function of frequency comb spacing (repetition rate) in accordance with an embodiment of the invention. This graph shows the electronic frequency-comb detector conversion loss over IF frequencies when, for example, $f_{RF}$=80 GHz+$f_{IF}$. The output power of the heterodyne detector may drop as $f_{IF}$ gets larger.

While specific experimental measurements of electronic frequency-comb detectors are described above with reference to FIGS. 9A, 9B, and 10-13, any of a variety of experimental measurements of the electronic frequency-comb detector can be utilized as appropriate to the requirements of specific applications in accordance with various embodiments of the invention. Dual comb detection experimental measurements of electronic frequency-comb detectors in accordance with a number of embodiments of the invention are discussed further below.

Dual Comb Detection Experimental Measurements

Figures 14A, 14B:
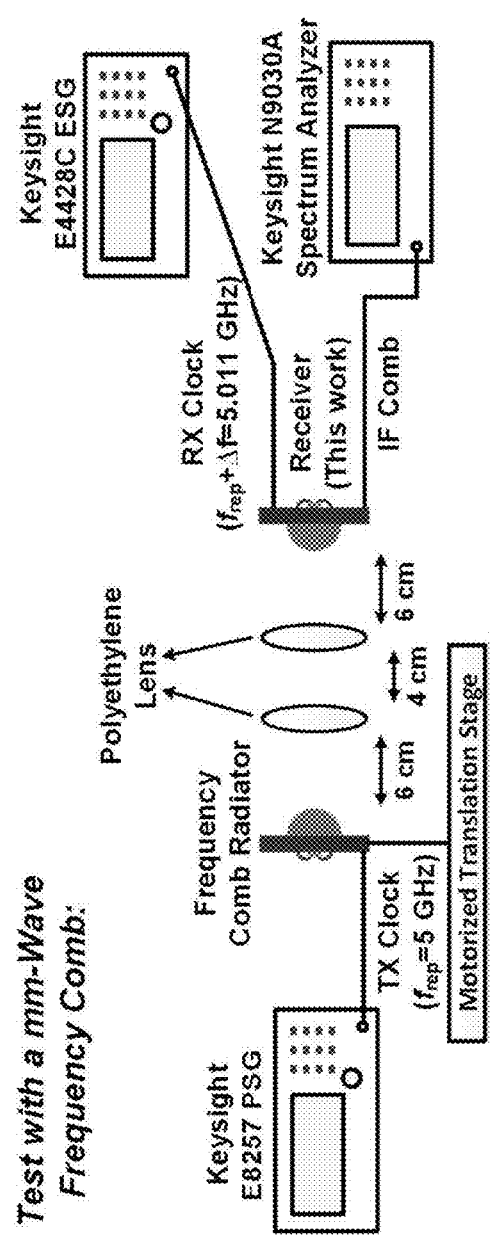
FIG. 14A shows a diagram of a measurement setup for characterizing a dual comb detection scheme using a silicon chip with a digital-to-impulse generator to radiate signals to characterize the electronic frequency-comb detector in accordance with an embodiment of the invention.
FIG. 14B shows a photograph of an actual measurement setup for characterizing a dual-comb detection scheme using a silicon chip with a digital-to-impulse generator to radiate signals to characterize the electronic frequency-comb detector in accordance with an embodiment of the invention.
Figures 15A, 15B:
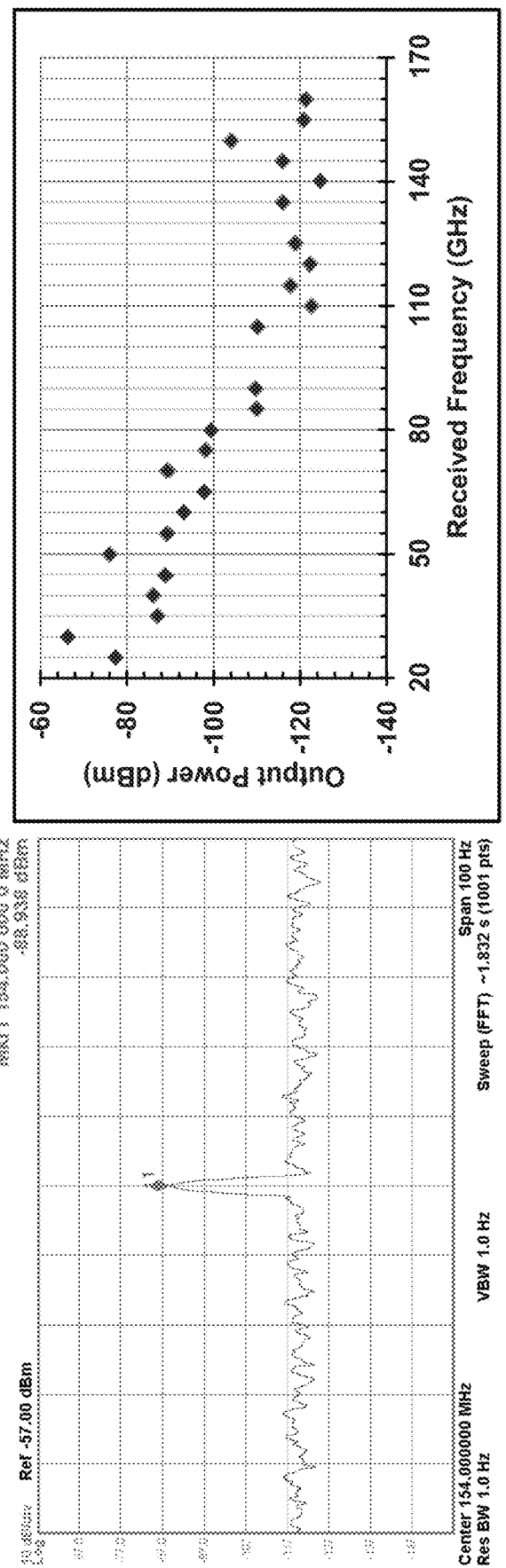
FIG. 15A shows measured IF tone output of an electronic frequency-comb detector in accordance with an embodiment of the invention.
FIG. 15B shows measured IF tone output power of an electronic frequency-comb detector as a function of received frequency in accordance with an embodiment of the invention.

In many embodiments, in order to characterize the performance of the electronic frequency-comb detector used in dual comb detection methods in accordance with several embodiments, multiple signal sources can be used as illustrated in FIG. 14A. In particular, a custom digital-to-impulse generator silicon chip can be used to radiate a frequency comb with tones beyond, for example, 110 GHz and comb spacing of, for example, 5 GHz (set by a Keysight source). In the test setup illustrated in FIG. 14A, the electronic frequency-comb detector can be operated with a repetition rate of, for example, 5.011 GHz (Δf=11 MHz). Two mm-wave polyethylene lenses can be placed at their focal length from the electronic frequency-comb detector and the transmitter in order to collimate the radiated beam and then focus it on the electronic frequency-comb detector. In this test, a silicon lens is attached to the backside of the electronic frequency-comb detector to increase the antenna efficiency, due to the low power of transmitted signal. Since the transmit and the electronic frequency-comb detector repetition rates have a slight difference, each transmitted tone can be represented by a unique tone in the IF output. FIG. 14B shows a photograph of an actual measurement setup for characterizing a dual-comb detection scheme using a silicon chip with a digital-to-impulse generator to radiate signals to characterize the electronic frequency-comb detector in accordance with an embodiment of the invention. FIG. 15A depicts the recovered tones of the frequency comb as well as one of the measured tones in accordance with an embodiment of the invention. The 154-MHz IF tone may correspond to the 154/11=14$^{th}$ tone of the frequency comb, which lies at 70-GHz. It has a line width of less than 2 Hz, which verifies the high precision in recovering frequency tones. By tuning the repetition rate of the LO accordingly, the electronic frequency-comb detector can successfully detect every frequency tone, for example, from 30 to 160 GHz with a resolution of 2 Hz. Therefore, the electronic frequency-comb detector can be used as a broadband spectrum analyzer to detect frequency tones with a resolution of 2 Hz, or as a dual-comb spectrometer to detect gases with absorption lines of at least 2 Hz. FIG. 15B shows measured IF tone output power of an electronic frequency-comb detector as a function of received frequency of FIG. 14A in accordance with an embodiment of the invention.

FIG. 16A depicts conversion loss as a function of frequency for an electronic frequency-comb detector with thinned substrate in accordance with an embodiment of the invention. FIG. 16B depicts sensitivity as a function of frequency for an electronic frequency-comb detector with thinned substrate in accordance with an embodiment of the invention.

While specific experimental measurements of the electronic frequency-comb detector used in dual comb detection methods are described above with reference to FIGS. 14A, 14B, 15A, 15B, 16A and 16B, any of a variety of experimental measurements of the electronic frequency-comb detector used in dual comb detection methods can be utilized as appropriate to the requirements of specific applications in accordance with various embodiments of the invention.

Performance Comparison

An electronic frequency-comb detector chip in accordance with many embodiments can consume, for example, as low as 34 mW from a 1.2V power supply. FIG. 17 compares the performance of electronic frequency-comb detectors reported with other mm-wave/THz receivers in silicon in accordance with an embodiment of the invention. A feature of this electronic frequency-comb detector chip can be its ability to coherently detect any frequency tone from, for example, 30 to 160 GHz with a resolution of 2 Hz while all LO tones may be locked to a single external clock.

While specific parameters of the electronic frequency-comb detector chip are described above with reference to FIG. 17, any of a variety of specific parameters of the electronic frequency-comb detector chip can be utilized as appropriate to the requirements of specific applications in accordance with various embodiments of the invention. Machine-learning-assisted material classification using electronic frequency-comb detectors in accordance with a number of embodiments of the invention are discussed further below.

Machine-Learning-Assisted Material Classification Using Electronic Frequency-Comb Detector Various parameters such as MUT thickness, dimensions, impurities, and reflections from surrounding test setup can affect the received signals by the electronic frequency-comb detector. This increases the uncertainty in the detection results. In several embodiments, numerous measurements can be performed on the MUTs and supervised machine learning can be utilized for classification based on the numerous recorded data sets. Such learning tools can be used to build intelligent radars and sensors by utilizing the electronic frequency-comb detector, and identifying repetitive patterns in the recorded data. In many embodiments, heart rate detection, inattentive driving behavior detection using a frequency-modulated continuous-wave (FMCW) radar, and material classification can be performed using the electronic frequency-comb detector and supervised learning algorithms.

In several embodiments, supervised learning tools can use a series of known input-output pairs to make decisions about which output to map to a new input. In certain embodiments, multiple supervised learning tools from Scikit-learn library in Python can be utilized to perform classification using measured transmittance values of multiple materials. These supervised learning tools include, for example, 1) Support Vector Machine (SVM), 2) Multi-layer Perceptron (MLP), 3) Naive Bayes, and 4) Gaussian Process Classifier. In other embodiments, any of a variety of machine learning tools can be used to build machine-learning-assisted-material classifiers using training data captured in a manner similar to that described above as appropriate to the requirements of a given application.

In certain embodiments, a machine-learning-assisted material classification system includes an electronic frequency-comb detector, a processor, and a memory containing a machine learning classifier application, where the machine learning classifier application configures the processor to classify materials under test based upon inputs received from the spectrum analyzer. In many embodiments, an electronic frequency-comb detection system includes an electronic frequency-comb detector, a processor, and a memory containing a machine learning classifier application, where the machine learning classifier application configures the processor to classify materials under test based upon inputs received from the spectrum analyzer. In several embodiments, an electronic frequency-comb detection system includes an electronic frequency-comb detector, a processor, and a memory containing a machine learning classifier application, where the machine learning classifier application configures the processor to classify materials under test based upon inputs received from the spectrum analyzer where the machine learning classifier application further configures the processor to identify repetitive patterns in recorded data. In certain embodiments, an electronic frequency-comb detection system includes an electronic frequency-comb detector, a processor, and a memory containing a machine learning classifier application, where the machine learning classifier application configures the processor to classify materials under test based upon inputs received from the spectrum analyzer where the machine learning classifier application further configures the processor to detect driver inattentiveness by monitoring at least one of heart rate and breathing rate of a subject.

While specific parameters of the machine-learning-assisted material classification using electronic frequency-comb detector are described above, any of a variety of specific parameters of the machine-learning-assisted material classification using electronic frequency-comb detector electronic frequency-comb detector chip can be utilized as appropriate to the requirements of specific applications in accordance with various embodiments of the invention. Machine-learning-assisted material classification experimental measurements and classification results in accordance with a number of embodiments of the invention are discussed further below.

Figure 18A:
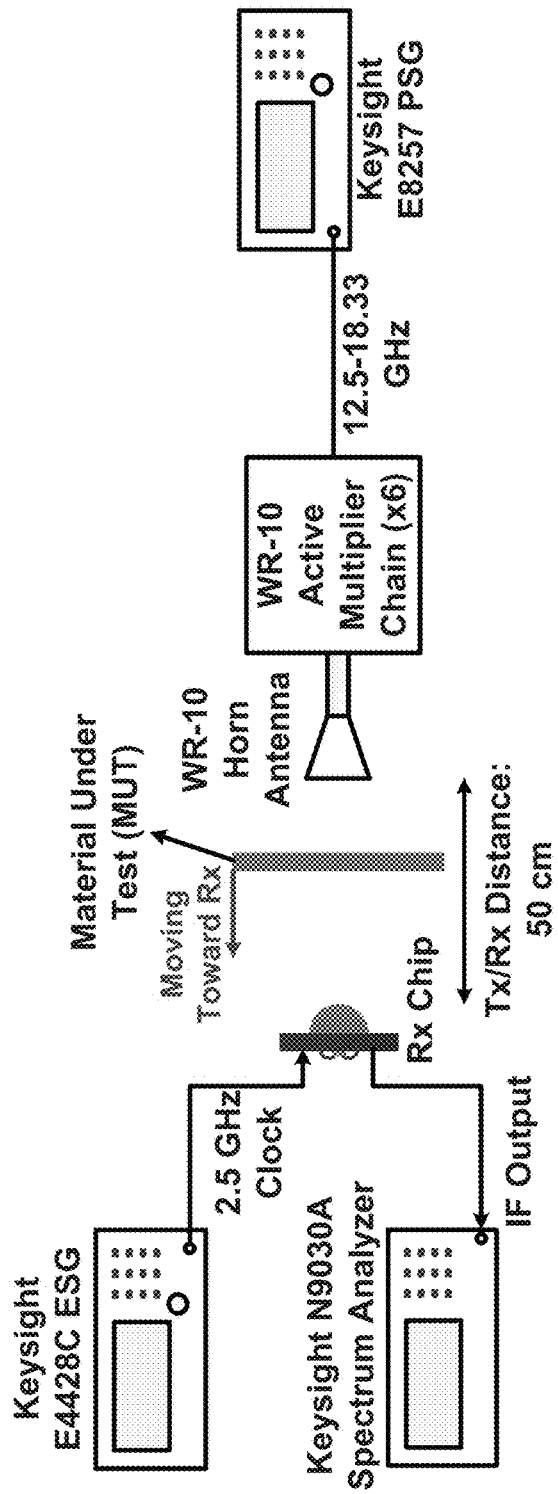
FIG. 18A shows a diagram of a measurement setup for characterizing a material under test (MUT) using an electronic frequency-comb detector in accordance with an embodiment of the invention.
Figure 18B:
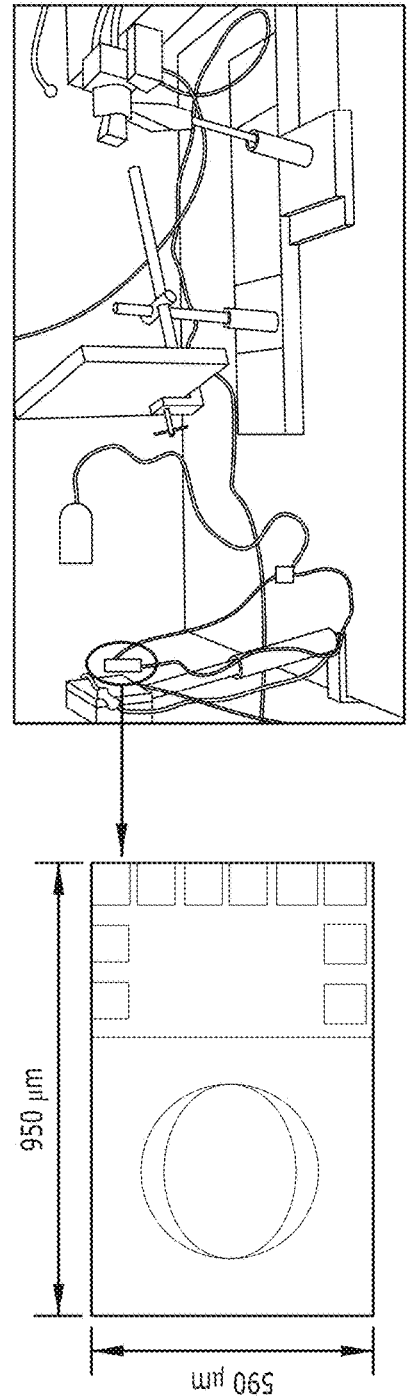
FIG. 18B shows a photograph of an actual measurement setup for characterizing a MUT using an electronic frequency-comb detector in accordance with an embodiment of the invention.

Machine-Learning-Assisted Material Classification Experimental Measurements and Classification Results In many embodiments, in order to characterize a MUT in accordance with several embodiments, multiple signal sources can be used as illustrated in FIG. 18A. In particular, FIG. 18A shows a diagram of a measurement setup for characterizing a MUT using an electronic frequency-comb detector in accordance with an embodiment of the invention. FIG. 18B shows a photograph of an actual measurement setup for characterizing a MUT using an electronic frequency-comb detector in accordance with an embodiment of the invention. As illustrated in FIG. 18A, a multiplier connected to a horn antenna may radiate CW signals from 75 to 110 GHz. Each slab of a MUT is placed between the radiator horn antenna and the electronic frequency-comb detector receiver. The received signal power is measured with and without the presence of the MUT. The effect of the MUT on the mm-wave signal can be measured by subtracting the two power levels in dB.

Figure 19:
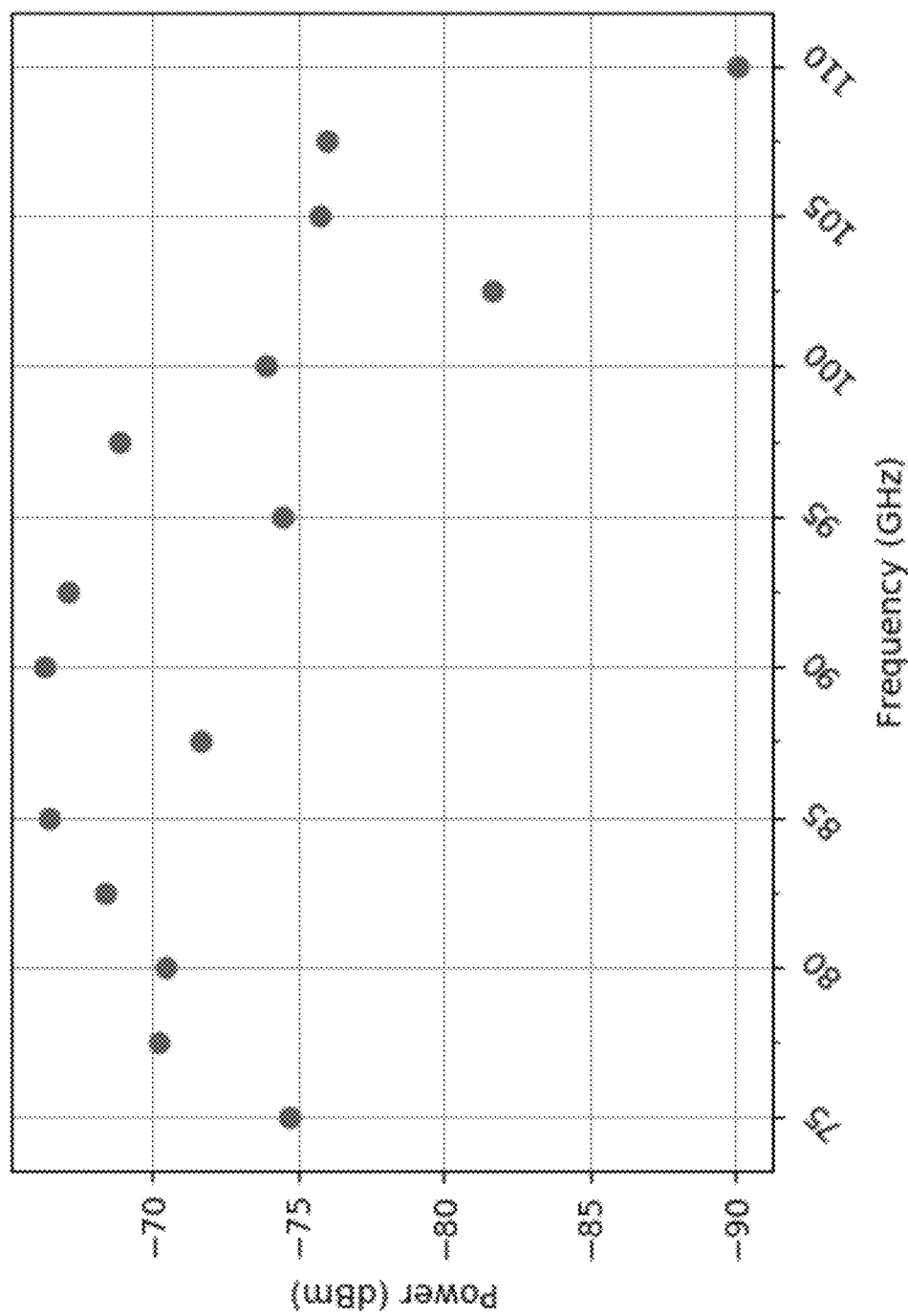
FIG. 19 shows an IF signal power as a function of frequency when an electronic frequency-comb detector detects signals from 75 to 100 GHz in accordance with an embodiment of the invention.

In certain embodiments, the clock frequency ($f_0$) of the electronic frequency-comb detector is set, for example, to 2.5 GHz while the radiator source frequency is swept from, for example, 75.047 GHz to 110.047 GHz with the steps of, for example, 2.5 GHz so that $f_{IF}$ is fixed at, for example, 47 MHz. FIG. 19 depicts an IF signal power as a function of frequency when an electronic frequency-comb detector detects signals from 75 to 100 GHz in accordance with an embodiment of the invention. The values in FIG. 19 are used as reference values for measuring the effects of each MUT slab on the W-band signals.

Figure 20:
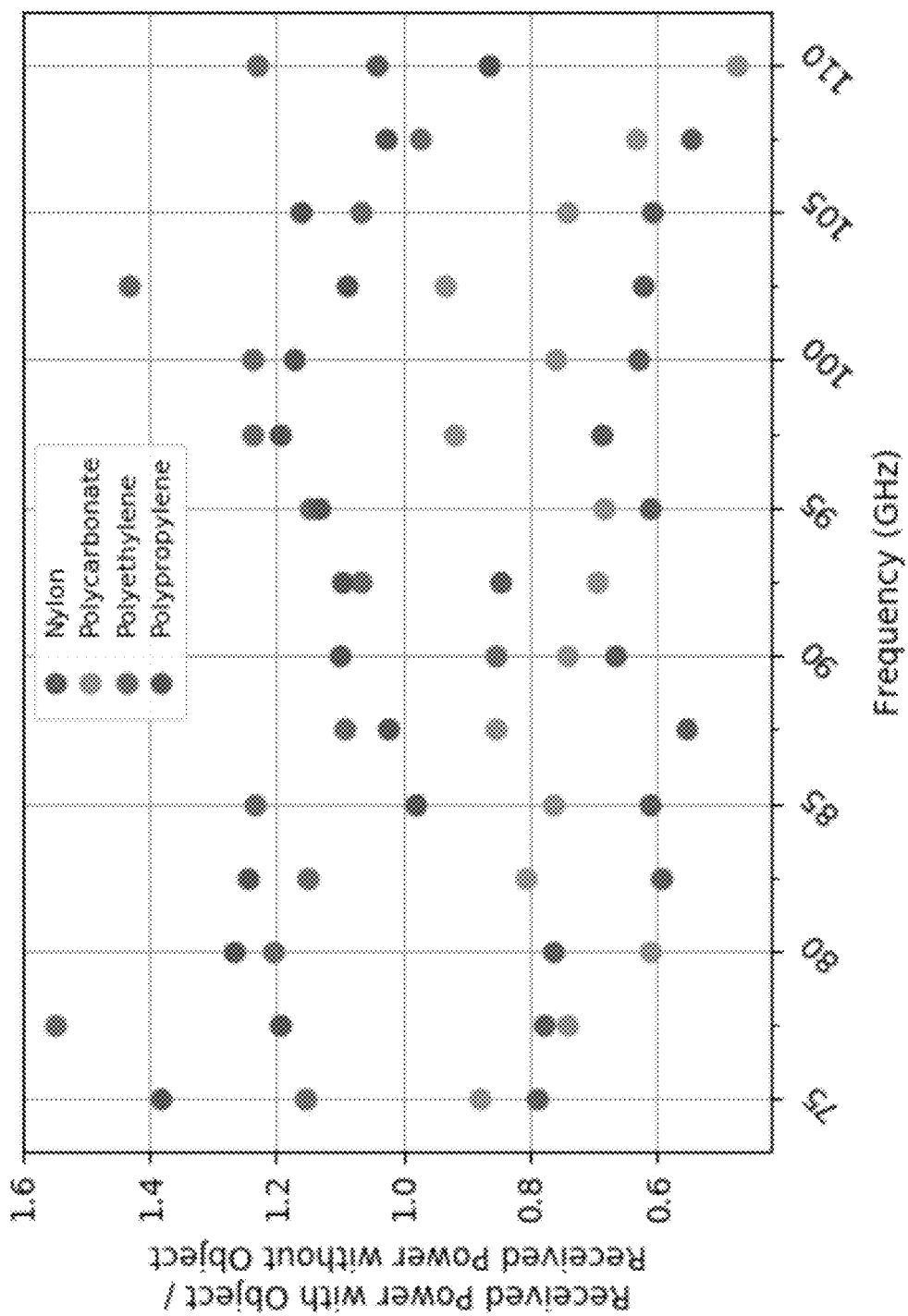
FIG. 20 shows transmittance of material slabs place at a small distance from an electronic frequency-comb detector in accordance with an embodiment of the invention.

In several embodiments, the distance between the radiator source and the electronic frequency-comb detector is, for example, 50 cm while the MUT slab position with respect to electronic frequency-comb detector is swept from, for example, 45 cm to 25 cm. The measurements on each object can be performed sixty times, with the MUT slab moving toward the electronic frequency-comb detector by about 3 mm every time. In many embodiments, the distance sweep is performed to ensure that the supervised learning tools can classify the MUT and predict the material even with varying MUT positions between the radiator source and the electronic frequency-comb detector. Note that the specific number of measurements and movements between measurements can vary. In certain embodiments, transmittance values for all of the materials under test at a fixed distance from the electronic frequency-comb detector are plotted in FIG. 20. In certain embodiments, for example for polyethylene and polypropylene, the received power increases after inserting the MUT slab, which could be caused by a lens effect in which the MUT slab focuses more power on the electronic frequency-comb detector antenna. The MUT slabs can be tilted by, for example, 30 degrees in the measurements in order to alleviate the standing wave effect caused by multiple reflections between the radiator source and the MUT slab. In a separate set of tests, transmission measurements were performed on three slabs made of UHMW polyethylene with different thicknesses (for example, ½", ¼", and ⅛") in order to classify the measured data based on the MUT slab thickness. Note that the specific tilt angle and slab thicknesses can vary.

Figure 21A:
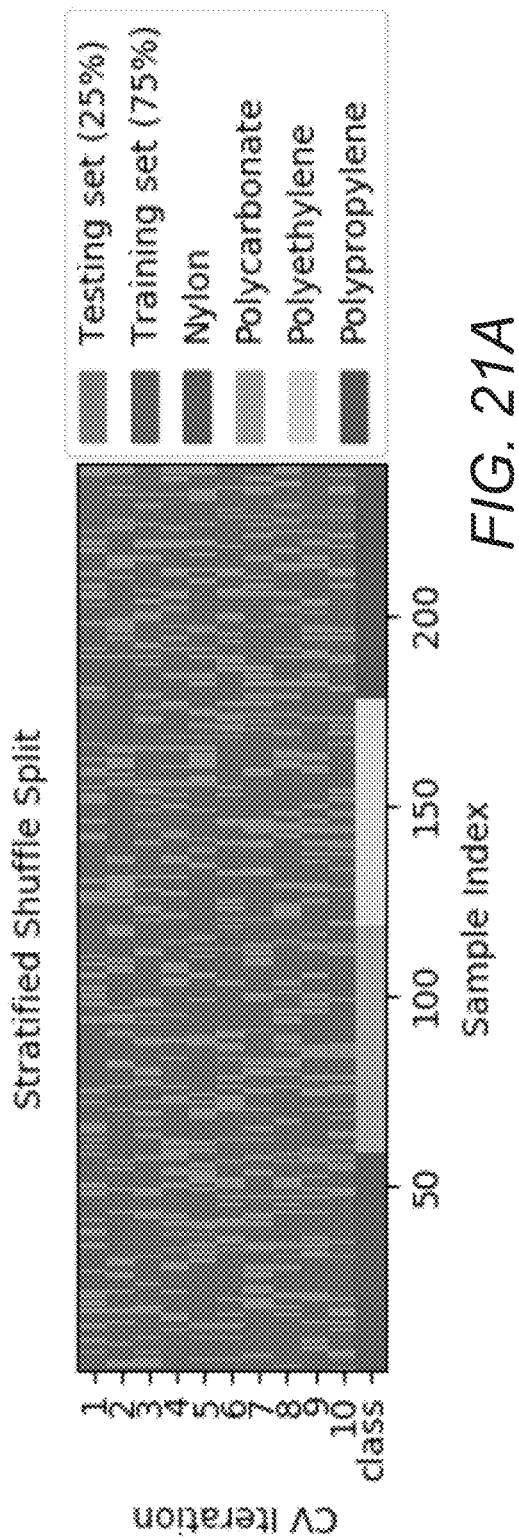
FIG. 21A shows various iterations to shuffle measured samples into training and testing sets in accordance with an embodiment of the invention.
Figure 21B:
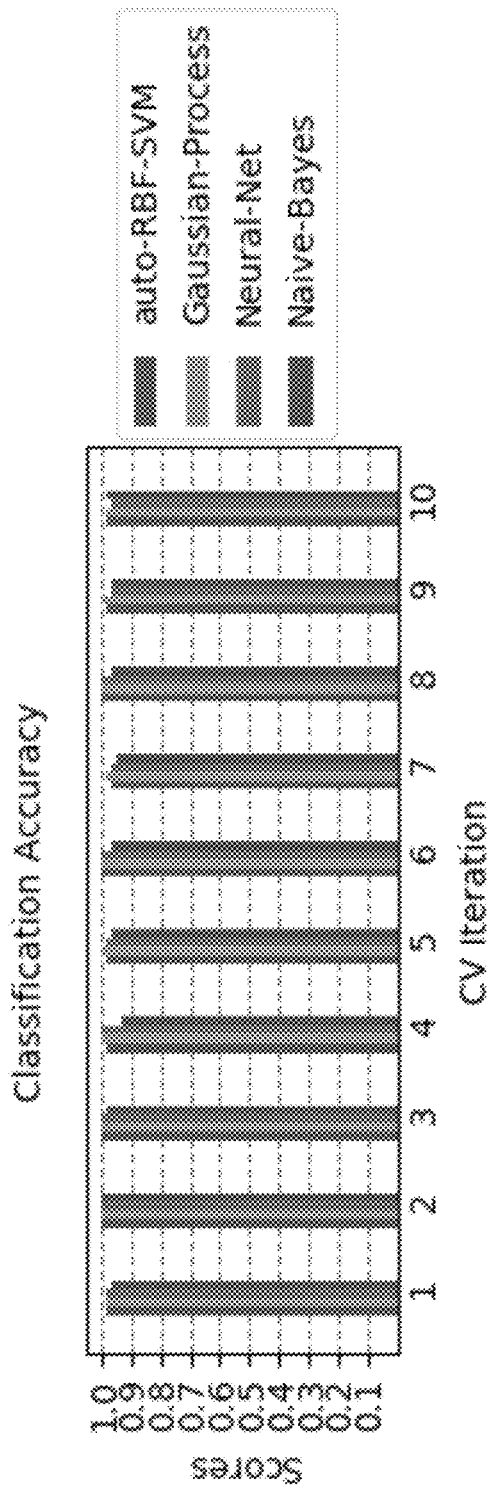
FIG. 21B shows an accuracy of one or more supervised learning tools in predicting the materials in FIG. 21A in accordance with an embodiment of the invention.

In many embodiments, measurements on each MUT can produce 60 vectors, where each vector contains transmittance values from, for example, 75 to 110 GHz. Note that the specific number of vectors and transmittance values can vary. In certain embodiments, the total vectors from all MUTs were divided into training and testing data sets for classification purposes. In several embodiments, stratified shuffle splitting technique was used to assign 75% of the data for training and 25% of the data for testing in 10 different cross-validation iterations, or folds. The 10 randomized folds were made by preserving the proportion of data samples for each class. Note that the specific percentage of division between training data and testing data, and the number of randomized folds can vary. Classification procedures using the multiple learning tools were performed on the training data from these 10 iterations and the rates of correct predictions on the testing data were recorded as classification accuracy scores. FIG. 21A illustrates the allocation of samples to training and testing sets in accordance with an embodiment of the invention. FIG. 21B illustrates the material classification results for each of the iterations in accordance with an embodiment of the invention. The results indicate that the lowest level of accuracy occurs for the seventh iteration, in which the Gaussian Process Classifier predicts the material correctly for 98% of the testing samples.

In many embodiments, the effect of the number of measured frequency samples on the classification accuracy can be shown by using the same supervised learning tools trained with three different sets of inputs. Their classification accuracy scores are illustrated in FIG. 22.

Figure 23A:
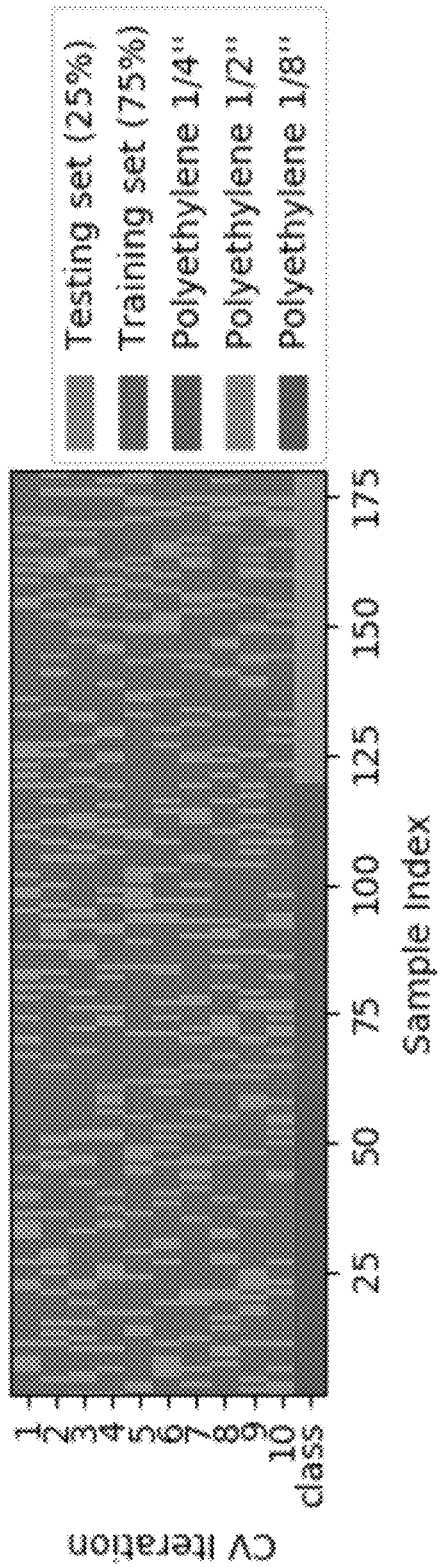
FIG. 23A shows various iterations to shuffle measured samples into training and testing sets for thickness measurement in accordance with an embodiment of the invention.
Figure 23B:
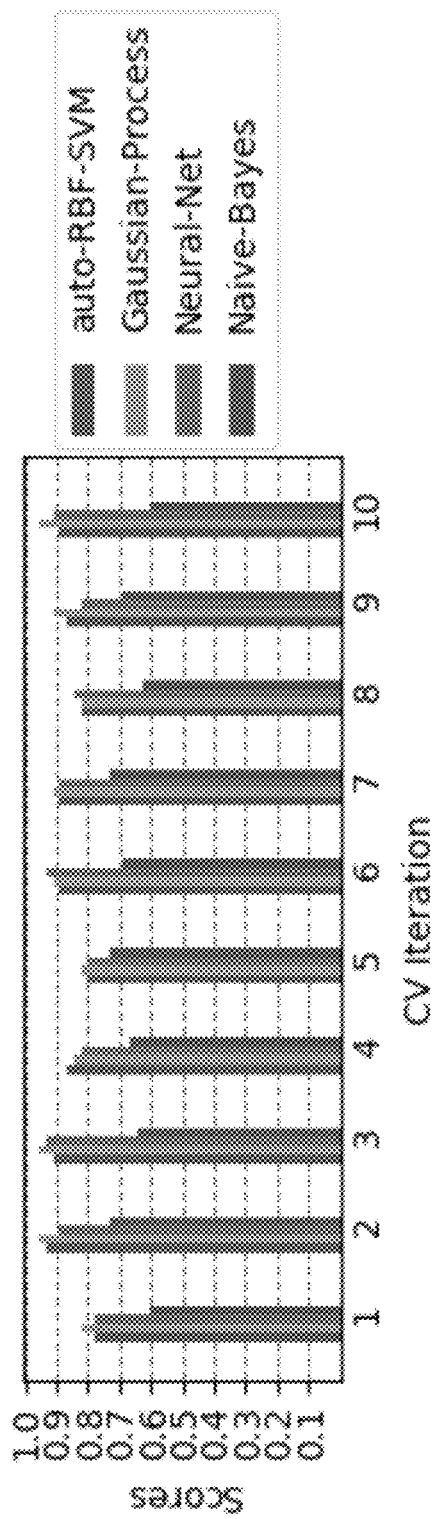
FIG. 23B shows the accuracy of each of the one or more supervised learning tools in predicting the thickness of the materials in accordance with an embodiment of the invention.

In certain embodiments, a similar classification procedure was performed on measured results obtained from three dielectric slabs made of polyethylene with different thicknesses. FIGS. 23A and 23B summarizes the thickness classification results for different classifiers. It is observed that in each cross-validation iteration, there is at least one classifier that predicts the thickness of the testing samples with an accuracy of at least 82%.

While specific machine-learning-assisted material classification experimental measurements and classification results are described above with reference to FIGS. 18A, 18B, 19A, 20, 21A, 21B, 22, 23A and 23B, any of a variety of machine-learning-assisted material classification experimental measurements and classification results can be utilized as appropriate to the requirements of specific applications in accordance with various embodiments of the invention.

While the above descriptions and associated figures have depicted the implementation of particular configurations of electronic frequency-comb detectors, it should be clear that any of a variety of configurations for electronic frequency-comb detectors can be implemented in accordance with embodiments of the invention. More generally, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An electronic frequency-comb detection system, comprising:
   an electronic frequency-comb detector comprising:
      a frequency-comb generator configured to generate a frequency comb reference signal, wherein the frequency-comb generator comprises a series of inverter stages; and
      a heterodyne mixer;
      wherein the heterodyne mixer is configured to use the frequency comb reference signal to downconvert received millimeter wave (mm-wave) and terahertz (THZ) frequency tones into an intermediate frequency (IF) signal.

2. The electronic frequency-comb detection system of claim 1, wherein the heterodyne mixer comprises an N-Channel MOSFET transistor (NFET).

3. The electronic frequency-comb detection system of claim 2, wherein the gate of the NFET is connected to an output of the frequency-comb generator.

4. The electronic frequency-comb detection system of claim 3, wherein a source of the NFET is configured to receive mm-wave and THZ frequency tones from an on-chip antenna.

5. The electronic frequency-comb detection system of claim 4, wherein a gate of the NFET is configured to receive the frequency comb reference signal.

6. The electronic frequency-comb detection system of claim 5, wherein the NFET is configured to generate an IF signal at the drain of the NFET.

7. The electronic frequency-comb detection system of claim 1, further comprising an external clock configured to feed a clock to an input of the frequency-comb generator.

8. The electronic frequency-comb detection system of claim 1, wherein the frequency comb reference signal is a local oscillator (LO) signal having a tunable repetition rate.

9. The electronic frequency-comb detection system of claim 1, further comprising an IF amplifier.

10. The electronic frequency-comb detection system of claim 9, wherein the IF amplifier is configured to feed a spectrum analyzer configured to detect a signature of a material under test (MUT).

11. The electronic frequency-comb detection system of claim 10, further comprising:
   a processor, and
   a memory containing a machine learning classifier application,
   where the machine learning classifier application configures the processor to classify materials under test based upon inputs received from the spectrum analyzer.

12. The electronic frequency-comb detection system of claim 11, wherein the machine learning classifier application further configures the processor to identify repetitive patterns in recorded data.

13. The electronic frequency-comb detection system of claim 11, wherein the machine learning classifier application further configures the processor to monitor at least one of heart rate and breathing rate of a subject.

14. The electronic frequency-comb detection system of claim 1, wherein the electronic frequency-comb detector further comprises an on-chip antenna.

15. The electronic frequency-comb detection system of claim 14, wherein the on-chip antenna is an elliptical antenna.

16. The electronic frequency-comb detection system of claim 15, wherein the on-chip antenna comprises a metasurface layer.

17. The electronic frequency-comb detection system of claim 14, wherein the electronic frequency-comb detector is fabricated using a CMOS process.

18. An electronic frequency-comb detector, comprising:
   a frequency-comb generator with an output, the frequency-comb generator having a plurality of inverter stages;
   an NFET having its gate connected to the output of the frequency-comb generator; and
   an IF amplifier having a plurality of amplifier stages,
   wherein the frequency-comb generator, the NFET and the IF amplifier, in combination, are configured to downconvert a received radio frequency signal into an IF signal and amplify the IF signal.

19. A method of electronic frequency-comb spectroscopy, the method comprising:
- radiating electromagnetic waves in a direction of a material under test (MUT), wherein the MUT transmits a portion of the electromagnetic waves;
- generating a reference signal using a frequency-comb generator, wherein the frequency-comb generator comprises a series of inverter stages;
- receiving the portion of the electromagnetic waves transmitted by the MUT by an on-chip antenna;
- mixing the portion of the electromagnetic waves received by the on-chip antenna and the reference signal using a mixer to generate an IF signal;
- amplifying the IF signal using an amplifier to produce an amplified IF signal;
- feeding the amplified IF signal to a spectrum analyzer; and
- detecting a signature of the MUT using the spectrum analyzer.

* * * * *